(12) United States Patent
Younggren et al.

(10) Patent No.: US 9,057,439 B2
(45) Date of Patent: Jun. 16, 2015

(54) INFINITELY VARIABLE TRANSMISSION WITH IVT TRACTION RING CONTROLLING ASSEMBLIES

(71) Applicant: TEAM Industries, Inc., Bagley, MN (US)

(72) Inventors: Bruce H. Younggren, Bemidji, MN (US); John E. Hamrin, Bemidji, MN (US); Joel Dunlap, Bemidji, MN (US)

(73) Assignee: TEAM Industries, Inc., Bagley, MN (US)

( * ) Notice: Subject to any disclaimer, the term of this patent is extended or adjusted under 35 U.S.C. 154(b) by 0 days.

(21) Appl. No.: 13/804,287

(22) Filed: Mar. 14, 2013

(65) Prior Publication Data

US 2014/0274533 A1     Sep. 18, 2014

(51) Int. Cl.
*F16H 61/664*     (2006.01)
*F16H 15/52*     (2006.01)

(52) U.S. Cl.
CPC ...... *F16H 61/664* (2013.01); *F16H 2061/6641* (2013.01); *F16H 15/52* (2013.01)

(58) Field of Classification Search
CPC .................................................. F16H 61/6645
USPC ......................................................... 475/257
See application file for complete search history.

(56) References Cited

U.S. PATENT DOCUMENTS

| | | | | |
|---|---|---|---|---|
| 2,526,435 | A | * | 10/1950 | Teigman ............................ 476/5 |
| 2,727,396 | A | * | 12/1955 | Haugwitz ........................... 476/5 |
| 4,270,415 | A | * | 6/1981 | Dickinson et al. .............. 477/50 |
| 4,345,486 | A | | 8/1982 | Olesen |
| 4,391,156 | A | | 7/1983 | Tibbals, Jr. |
| 6,120,399 | A | | 9/2000 | Okeson et al. |
| 6,322,475 | B2 | | 11/2001 | Miller |
| 6,569,043 | B2 | | 5/2003 | Younggren et al. |
| 6,733,406 | B2 | | 5/2004 | Kitai et al. |
| 6,813,553 | B2 | | 11/2004 | Nakamura et al. |

(Continued)

FOREIGN PATENT DOCUMENTS

WO      WO 02/088573 A2      11/2002

OTHER PUBLICATIONS

Model N360 NuVinci® CVP, Bicycle Drivetrain. Fallbrook Technologies Inc. 2010, 2 pages.

(Continued)

*Primary Examiner* — Ramya Burgess
*Assistant Examiner* — Mark Manley
(74) *Attorney, Agent, or Firm* — IPLM Group, P.A.

(57) ABSTRACT

An infinitely variable transmission includes an input assembly, an output assembly, an input/output planetary ratio assembly and a torque feedback control is provided. The input assembly is coupled to receive input rotational motion. The output assembly provides a rotational output. The output assembly is configured to be rotationally coupled to a load. The input/output planetary ratio assembly sets an input to output speed ratio. The input/output ratio assembly includes a first and a second stator. The torque feedback control assembly provides torque feedback to the input/output planetary ratio assembly to at least in part control the input to output speed ratio of the input/output planetary ratio assembly. The torque feedback control assembly includes a phase relation system operationally coupled to the first and second stator and a torque system operationally coupled to the output assembly. The phase relation system further is in operational communication with the torque system.

18 Claims, 21 Drawing Sheets

(56) References Cited

U.S. PATENT DOCUMENTS

| | | |
|---|---|---|
| 7,074,154 B2 | 7/2006 | Miller |
| 7,204,777 B2 | 4/2007 | Miller et al. |
| 7,581,467 B2 | 9/2009 | Peterman et al. |
| 7,727,106 B2 | 6/2010 | Maheu et al. |
| 7,762,919 B2 | 7/2010 | Smithson et al. |
| 7,762,920 B2 | 7/2010 | Smithson et al. |
| 7,770,674 B2 | 8/2010 | Miles et al. |
| 7,963,880 B2 | 6/2011 | Smithson et al. |
| 7,976,426 B2 | 7/2011 | Smithson et al. |
| 8,087,482 B2 | 1/2012 | Miles et al. |
| 8,360,917 B2 * | 1/2013 | Nichols et al. ............... 475/189 |
| 8,496,551 B2 | 7/2013 | Mueller et al. |
| 8,585,528 B2 | 11/2013 | Carter et al. |
| 8,668,623 B2 | 3/2014 | Vuksa et al. |
| 2002/0123400 A1 | 9/2002 | Younggren et al. |
| 2004/0171452 A1 | 9/2004 | Miller et al. |
| 2007/0270265 A1 | 11/2007 | Miller et al. |
| 2007/0270267 A1 | 11/2007 | Miller et al. |
| 2007/0270272 A1 | 11/2007 | Miller et al. |
| 2007/0270278 A1 | 11/2007 | Miller et al. |
| 2009/0164076 A1 | 6/2009 | Vasiliotis et al. |
| 2010/0056322 A1 | 3/2010 | Thomassy |
| 2010/0093480 A1 | 4/2010 | Pohl et al. |
| 2010/0267510 A1 | 10/2010 | Nichols et al. |
| 2010/0314184 A1 | 12/2010 | Stenberg et al. |
| 2011/0034284 A1 | 2/2011 | Pohl et al. |
| 2011/0088503 A1 | 4/2011 | Armstrong et al. |
| 2011/0092325 A1 | 4/2011 | Vuksa et al. |
| 2011/0172050 A1 | 7/2011 | Nichols et al. |
| 2011/0220453 A1 | 9/2011 | Mueller et al. |
| 2012/0115667 A1 | 5/2012 | Lohr et al. |
| 2012/0238386 A1 | 9/2012 | Pohl et al. |

OTHER PUBLICATIONS

NuVinci DELTASERIES Supercharger Drive. Fallbrook Technologies Inc. 2012, 2 pages.

NuVinci® N360 CVP Drivetrain Owner's Manual. Fallbrook Technologies Inc. Jul. 2010, 6 pages.

NuVinci® Parts Catalog, NuVinci N360 and NuVinci Harmony Parts Catalog—*B35-N360-12* Fallbrook Technologies Inc. 2012, 11 pages.

NuVinci® N360 Technical Manual. *B35-N360-02* Fallbrook Technologies Inc. 2012, 15 pages.

NuVinci® N360 Test Summary. Fallbrook Technologies Inc. 2010, 1 page.

NuVinci® Range and Gear Inch Comparison, NuVinci N360. Date unknown. 1 page.

Pohl, Brad, et al. "Configuration Analysis of a Spherical Traction Drive CVT/IVT". Fallbrook Technologies. Date unknown, 6 pages.

Non-Final Office Action of Corresponding U.S. Appl. No. 13/828,902 mailed on Feb. 26, 2014.

Search Report/ Written Opinion of International Application Serial No. PCT/US2014/021861 mailed Jun. 4, 2014.

Notice of Allowance (PTO-892) Notice of References cited. U.S. Appl. No. 13/828,046, mailed Jun. 16, 2014, 9 pages.

Search Report/ Written Opinion of International Application Serial No. PCT/US2014/021849 mailed Jun. 4, 2014.

\* cited by examiner

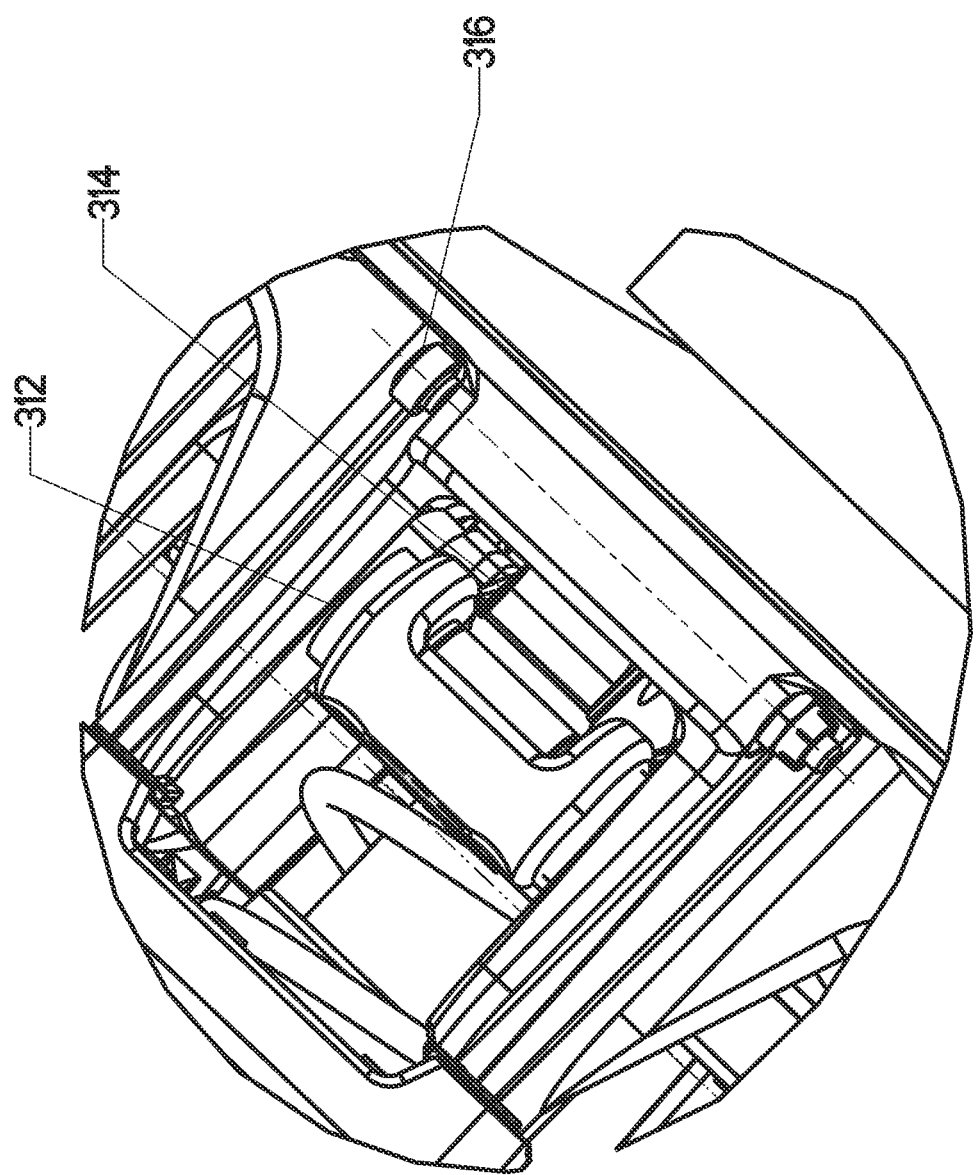

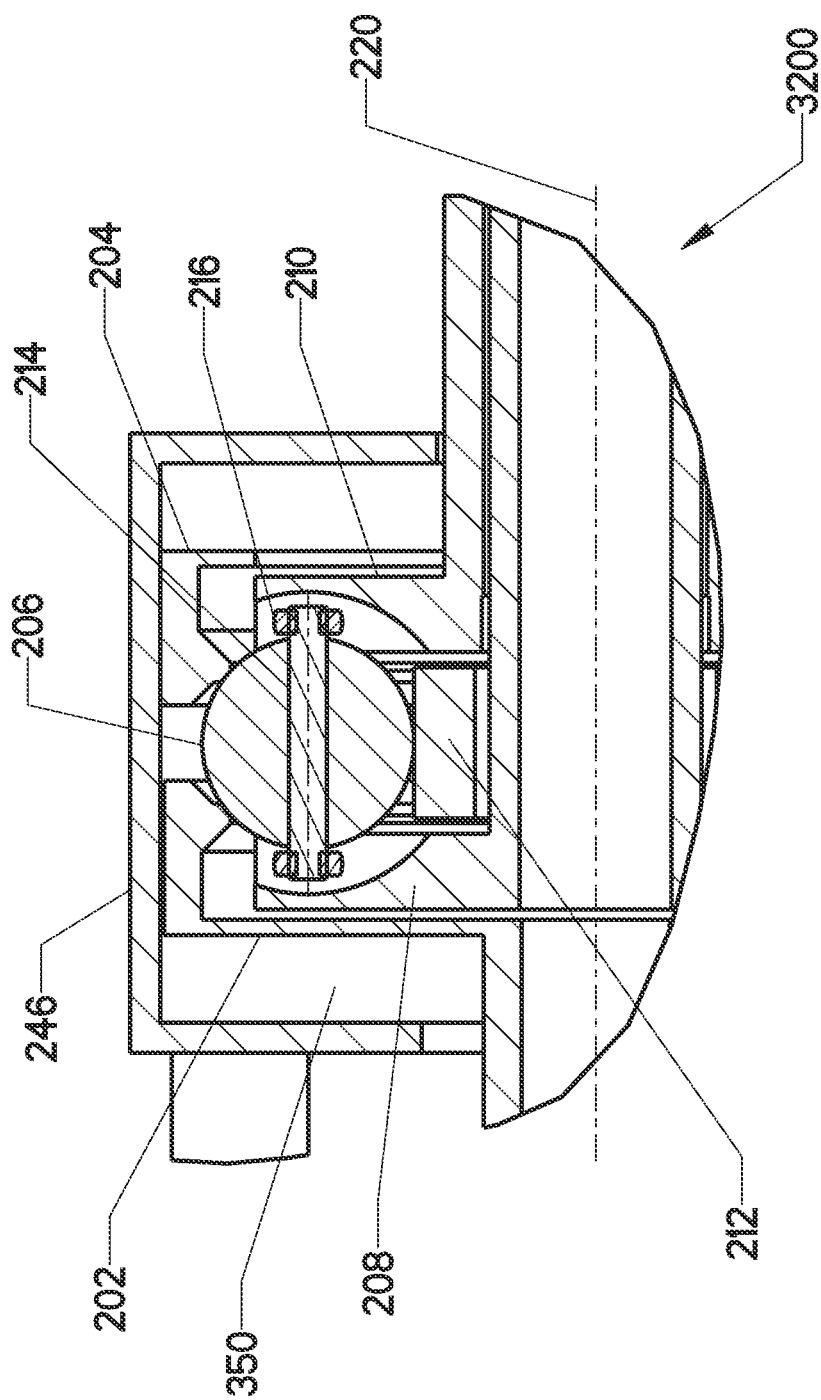

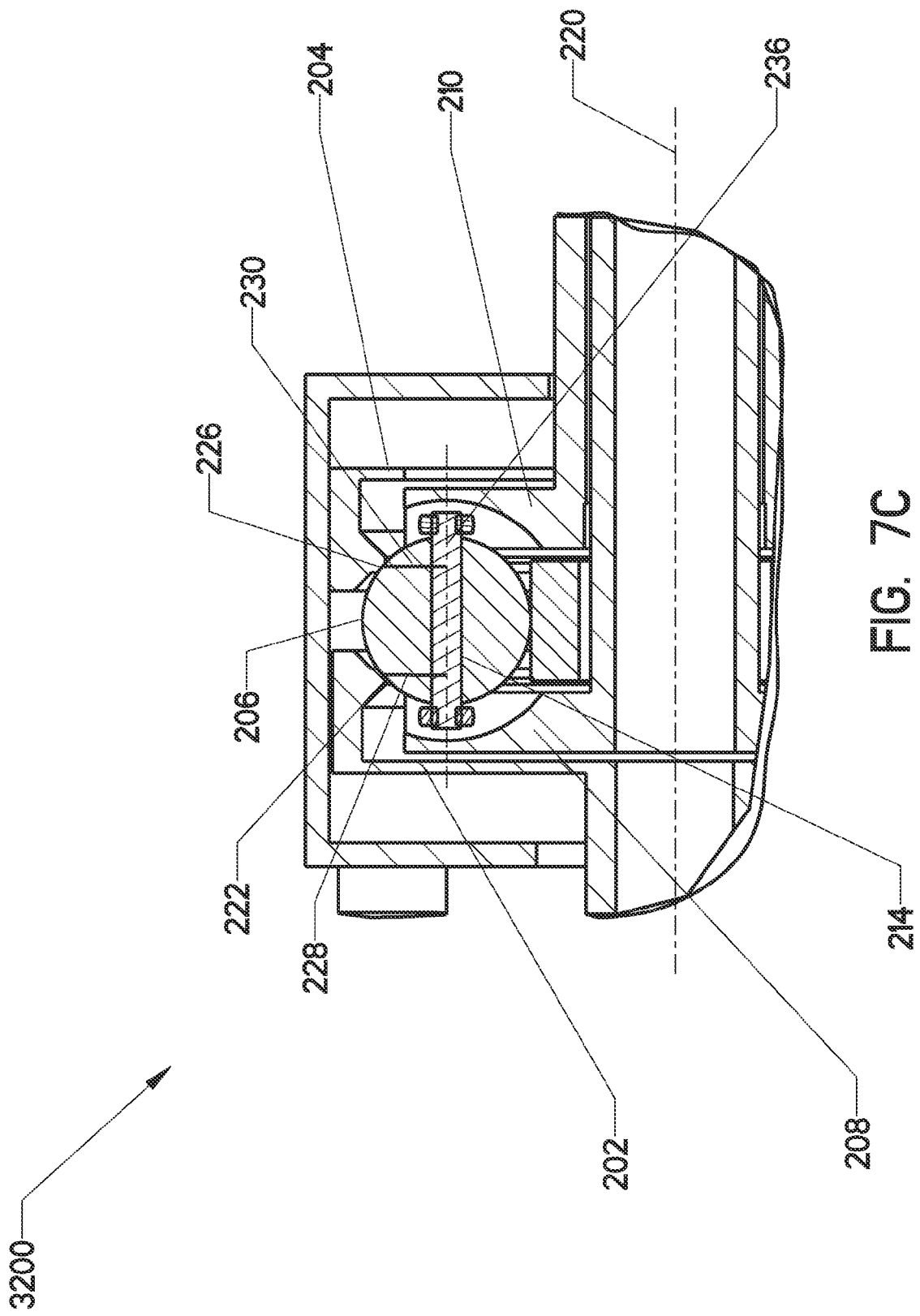

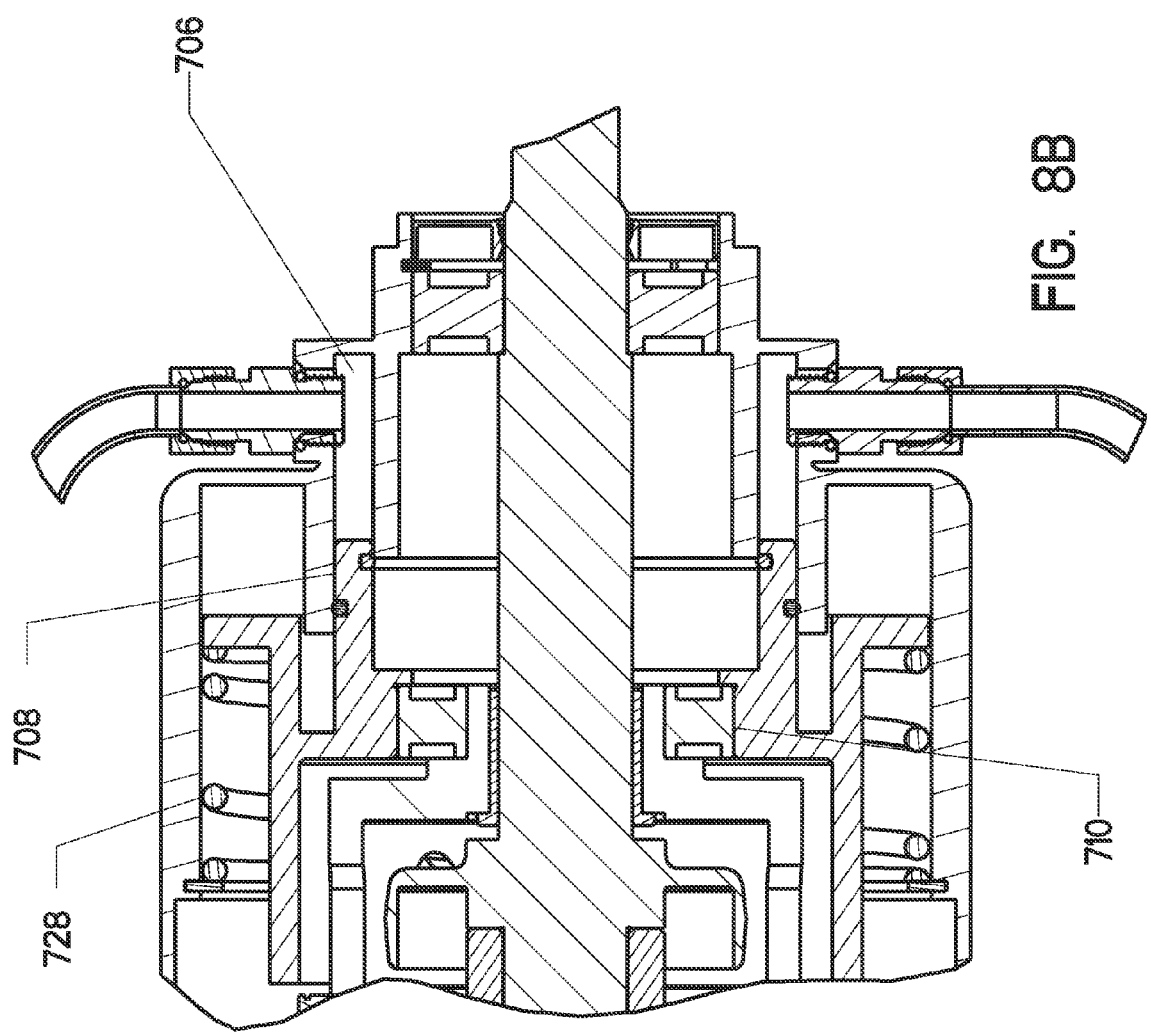

INFINITELY VARIABLE TRANSMISSION WITH IVT TRACTION RING CONTROLLING ASSEMBLIES

BACKGROUND

An infinitely variable transmission (IVT) is a transmission that continuously varies a speed ratio between an input speed and an output speed. An IVT can vary the input to output speed ratio from essentially an infinite value (neutral) to a finite value. This infinite speed ratio condition is sometimes known as a geared neutral. A subset of an IVT is a continuously variable transmission (CVT) that does not have a geared neutral. One type of IVT is a spherical-type that utilizes spherical speed adjusters, such as power adjusters, balls, planets, spherical gears or rollers. The spherical speed adjustors in this embodiment have tiltable axis of rotation that are adapted to be adjusted to achieve a desired ratio of input speed to output speed.

For the reasons stated above and for other reasons stated below which will become apparent to those skilled in the art upon reading and understanding the present specification, there is a need in the art for an effective an efficient method of controlling the variable shifting of an IVT.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, an infinitely variable transmission is provided. The infinitely variable transmission includes an input assembly, an output assembly, an input/output planetary ratio assembly and a torque feedback control. The input assembly is configured to be coupled to receive input rotational motion. The output assembly is used to provide a rotational output. The output assembly is configured to be rotationally coupled to a load. The input/output planetary ratio assembly is configured and arranged to set an input to output speed ratio. The input/output ratio assembly includes a first and a second stator. The torque feedback control assembly is configured and arranged to provide torque feedback to the input/output planetary ratio assembly to at least in part control the input to output speed ratio of the input/output planetary ratio assembly. The torque feedback control assembly includes a phase relation system operationally coupled to the first and second stator and a torque system operationally coupled to the output assembly. The phase relation system further is in operational communication with the torque system.

In another embodiment, an infinitely variable transmission is provided. The infinitely variable transmission includes an input assembly, an output assembly, an input/output planetary ratio assembly, an input speed feedback control assembly and a torque feedback control assembly. The input assembly is configured to be coupled to receive input rotational motion. The output assembly is used to provide a rotational output. The output assembly is configured to be rotationally coupled to a load. The input/output planetary ratio assembly is configured and arranged to set an input to output speed ratio. The input/output ratio assembly includes a first and second stator. The input speed feedback control assembly is configured and arranged to provide an axial force in response to a rotation from the input assembly. The torque feedback control assembly is configured and arranged to provide torque feedback to the input/output planetary ratio assembly to at least in part control the input to output speed ratio of the input/output planetary ratio assembly. The torque feedback control assembly is configured and arranged to provide torque feedback to the input/output planetary ratio assembly to at least in part control the input to output speed ratio of the input/output planetary ratio assembly. The torque feedback control assembly includes a phase relation system that is operationally coupled to the first and second stator and a torque system that is operationally coupled to the output assembly. The phase relation system further being in operational communication with the torque system.

The torque feedback control assembly includes a torque feedback cam having at least three sets of spider tracks, with at least one set of the spider tracks being not parallel with at least one other set of spider track. The torque feed control assembly further has a first cam spider that is operationally connected to the first stator and is received in a first set of spider tracks. The torque feed control assembly further yet has a second cam spider that is operationally connected to the second stator and is received in a second set of spider tracks and a third cam spider that is operationally coupled to the output assembly and is received in a third set of spider tracks.

In still another embodiment, an infinitely variable transmission is provided. The infinitely variable transmission includes an input assembly, an output assembly, an input/output planetary ratio assembly, an input feedback control assembly and a torque feedback control assembly. The input assembly is configured to be coupled to receive input rotational motion. The output assembly is used to provide a rotational output. The output assembly is configured to be rotationally coupled to a load. The input/output planetary ratio assembly is configured and arranged to set an input to output speed ratio. The input/output ratio assembly has a first stator coupled to a first shaft and a second stator coupled to a second shaft. The input speed feedback control assembly is configured and arranged to provide an axial force in response to a rotation from the input assembly. The torque feedback control assembly is configured and arranged to provide torque feedback to the input/output planetary ratio assembly to at least in part control the input to output speed ratio of the input/output planetary ratio assembly. The torque feedback control assembly includes a torque feedback cam and a first, second and third spiders. The torque feedback cam is configured and arranged to receive the axial force from the input speed feedback control assembly. The torque feedback cam has at least three sets of spider tracks, with at least one of the sets of spider tracks being not parallel with at least one other set of spider tracks. The first cam spider is operatively coupled to the first shaft. The first spider has portions received in a first set of spider tracks of the torque feedback cam. The second cam spider is operatively coupled to the second shaft. The second spider has portions received in a second set of the spider tracks of the feedback cam. The third cam spider has portions received in a third set of tracks. The third spider operationally coupled to the output assembly.

BRIEF DESCRIPTION OF THE DRAWINGS

The present invention can be more easily understood and further advantages and uses thereof will be more readily apparent, when considered in view of the detailed description and the following figures in which:

FIG. 3B is a perspective view of a portion of the input speed feedback control assembly of FIG. 3A;

FIG. 7A is a cross-sectional side view of the input/output planetary ratio assembly of the IVT of FIG. 6;

FIG. 7C is a cross-sectional side view of a portion of input/output planetary ratio assembly of FIG. 7A with an axle axis of the planet set to provide a first speed ratio;

FIG. 8B is a cross-sectional side view of a portion of the input speed feedback control assembly of FIG. 8A positioned to provide a second/high speed shift position;

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Figure 1:
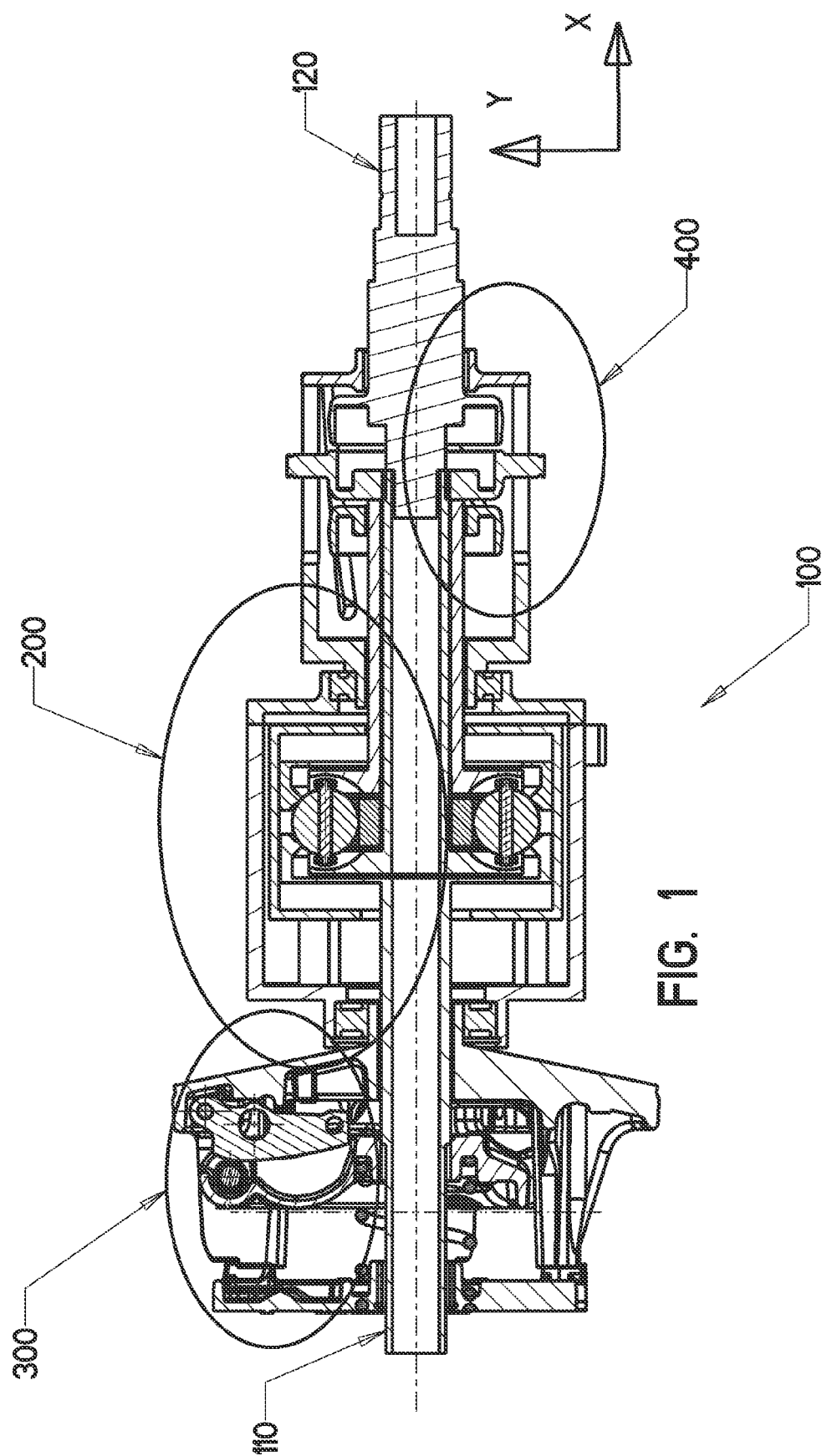
FIG. 1 is a cross-sectional diagram of an infinitely variable transmission (IVT) of one embodiment of the present invention.
Figure 6:
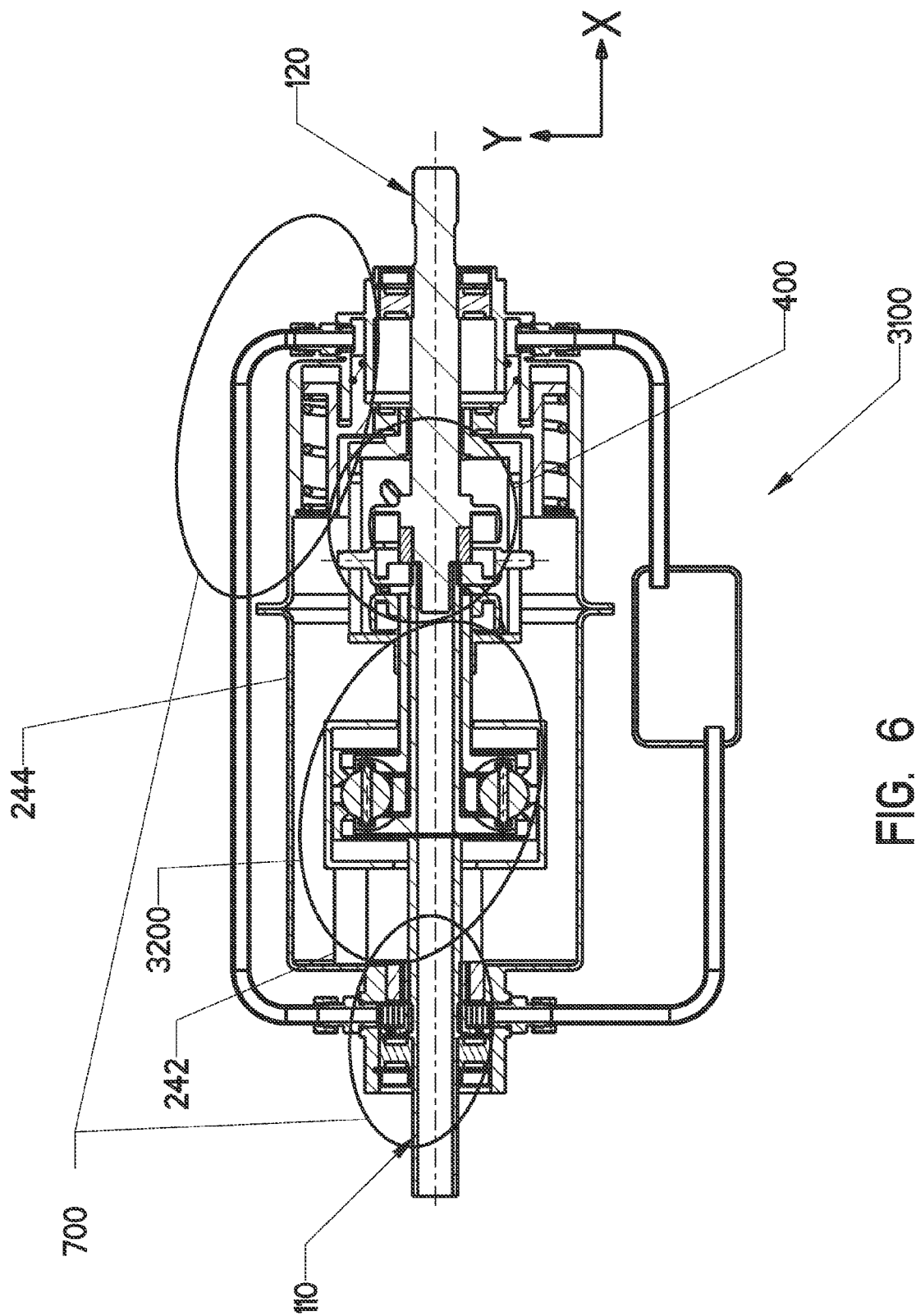
FIG. 6 is a cross-sectional diagram of an infinitely variable transmission (IVT) of another embodiment of the present invention.

Embodiments of the present invention provide an infinitely variable transmission (IVT) 100 and 3100 that includes a novel shifting mechanism. A cross-sectional side view of IVT 100 is illustrated in FIG. 1. A cross-sectional side view of IVT 3100 is illustrated in FIG. 6. IVTs 100 and 3100 are also known as an infinitely variable planetary. Elements of IVT 100 and IVT 3100 include an input assembly 110 which is connected directly or indirectly to a crankshaft of an engine to receive rotational motion. IVT 100 and IVT 3100 also include an output assembly 120 that is connected directly or indirectly to a load, such as, tires of a vehicle. Input speed feedback control assembly 300 of IVT 100 and 700 of IVT 3100 include part of a shifting mechanism that is connected directly or indirectly to the crankshaft of the engine. Torque feedback control assembly 400 includes part of the shifting mechanism that is connected directly or indirectly to the load. In embodiment 100, an input/output planetary ratio assembly 200 transfers rotational motion from the input assembly 110 to the output assembly 120. In embodiment 3100, an input/output planetary ratio assembly 3200 transfers rotational motion from the input assembly 110 to the output assembly 120. In an embodiment, the input/output ratio assembly 200 is an input/output planetary assembly 200 and in an embodiment, the input/output ratio assembly 3200 is an input/output planetary assembly 3200. The IVT 100 and 3100 changes the rotation input at the input assembly 110 to a rotational output at the output assembly 120 by a select ratio.

Figure 2A:
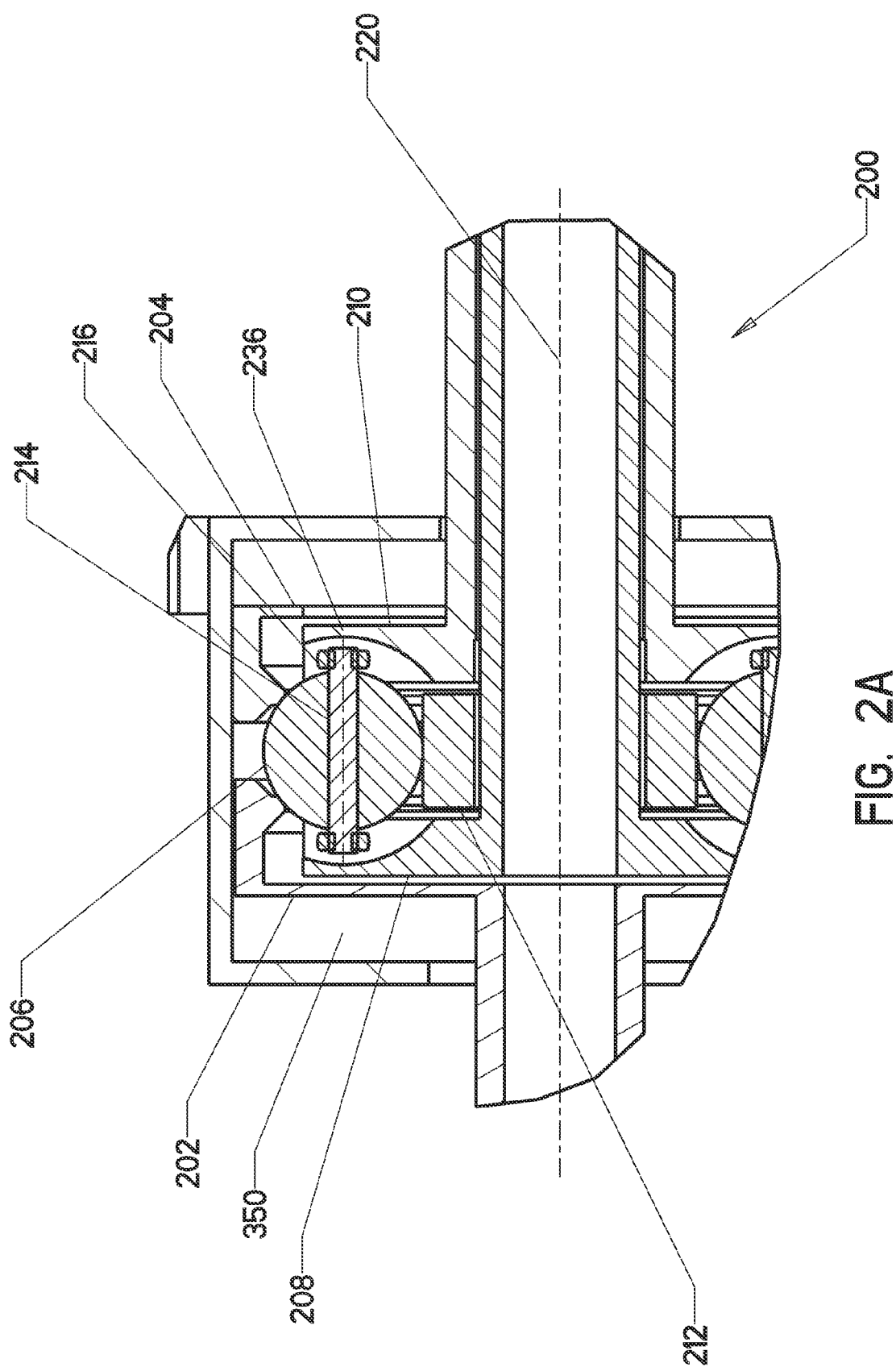
FIG. 2A is a cross-sectional side view of the input/output planetary ratio assembly of the IVT of FIG. 1.
Figure 2B:
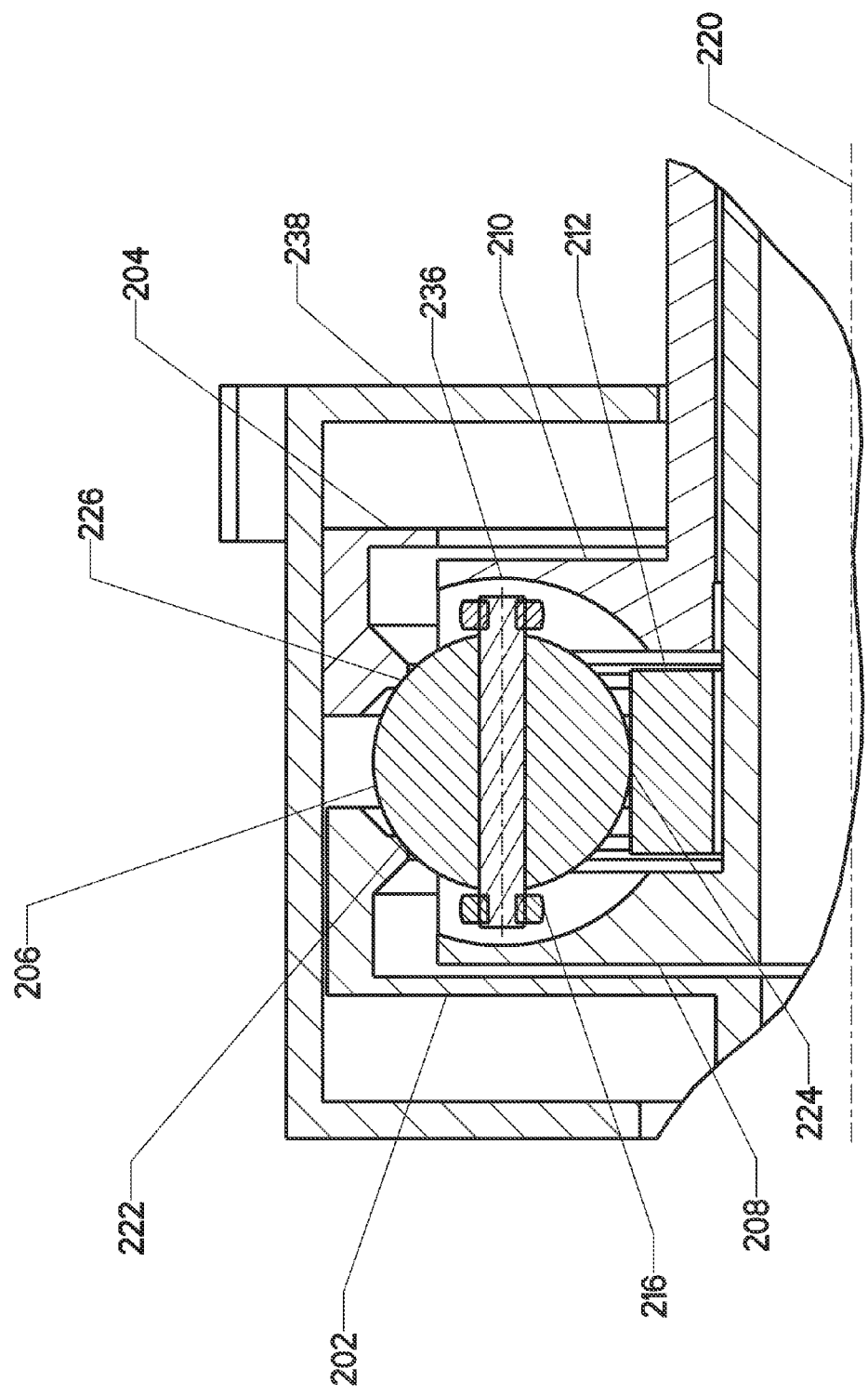
FIG. 2B is a cross-sectional side view of a portion of the input/output planetary ratio assembly of FIG. 2A.
Figure 2C:
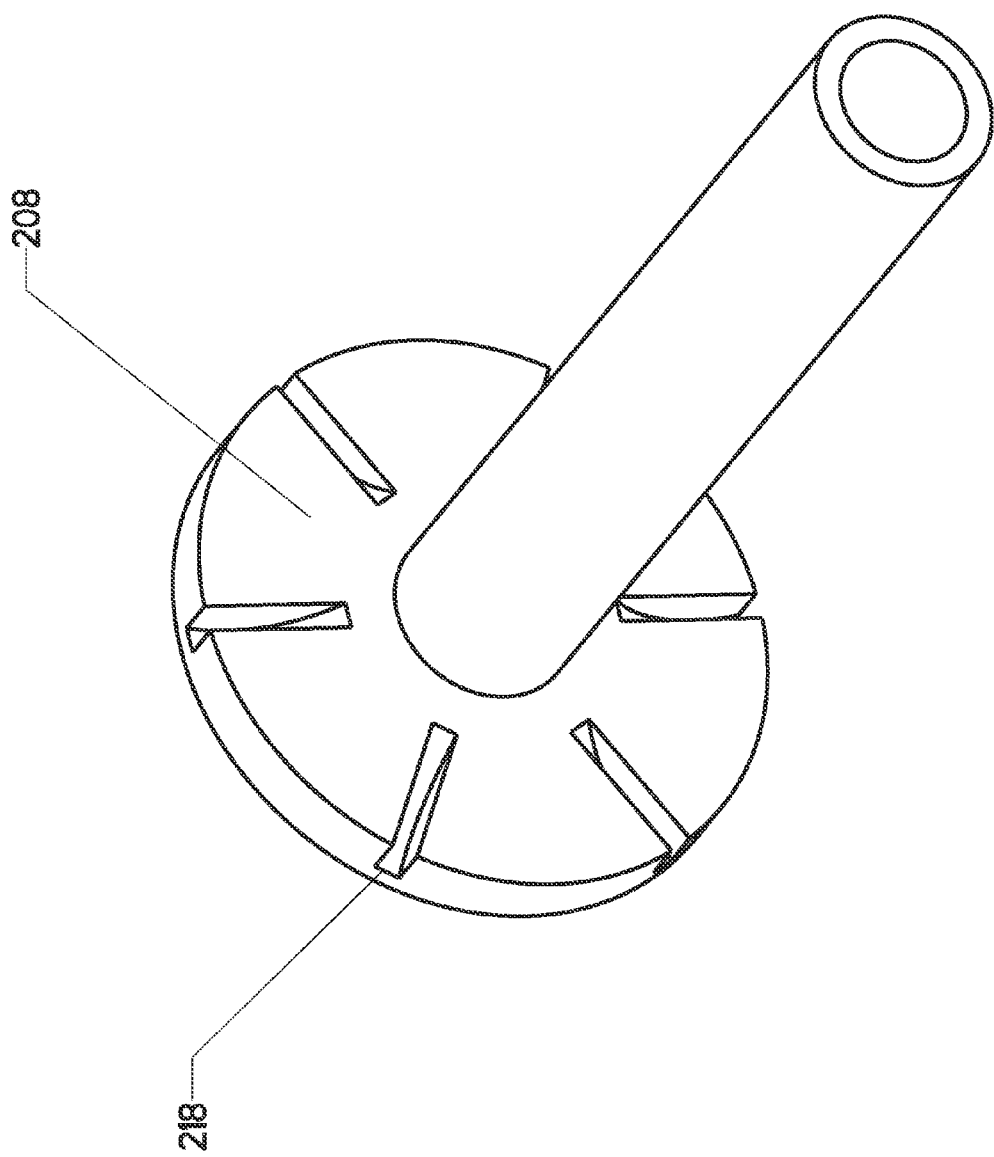
FIG. 2C is a front perspective view of a first stator of the input/output planetary ratio assembly of FIG. 2B.
Figure 5:
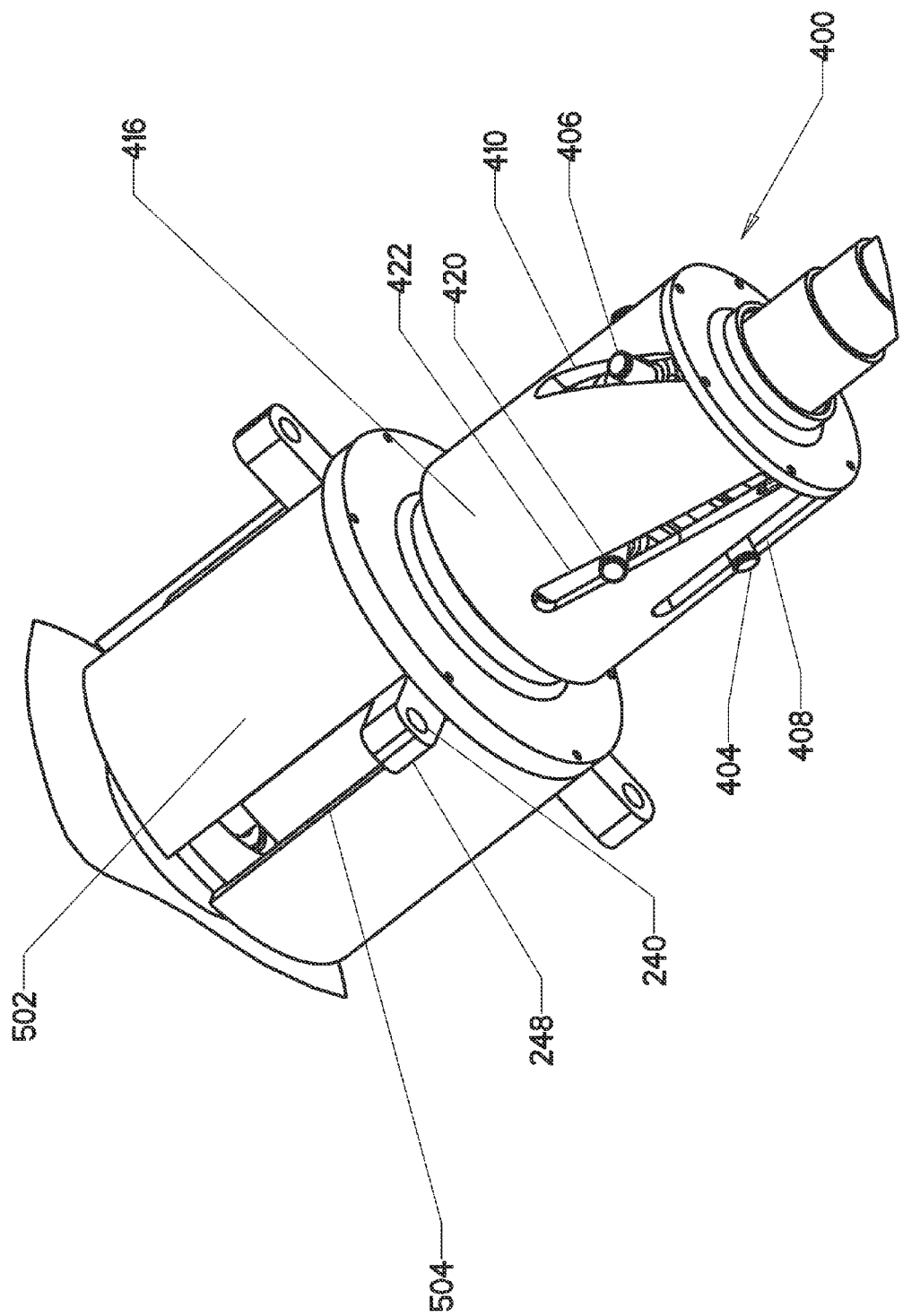
FIG. 5 is a perspective view of the torque feedback control assembly of FIG. 4 of the IVT of FIG. 1.
Figure 7B:
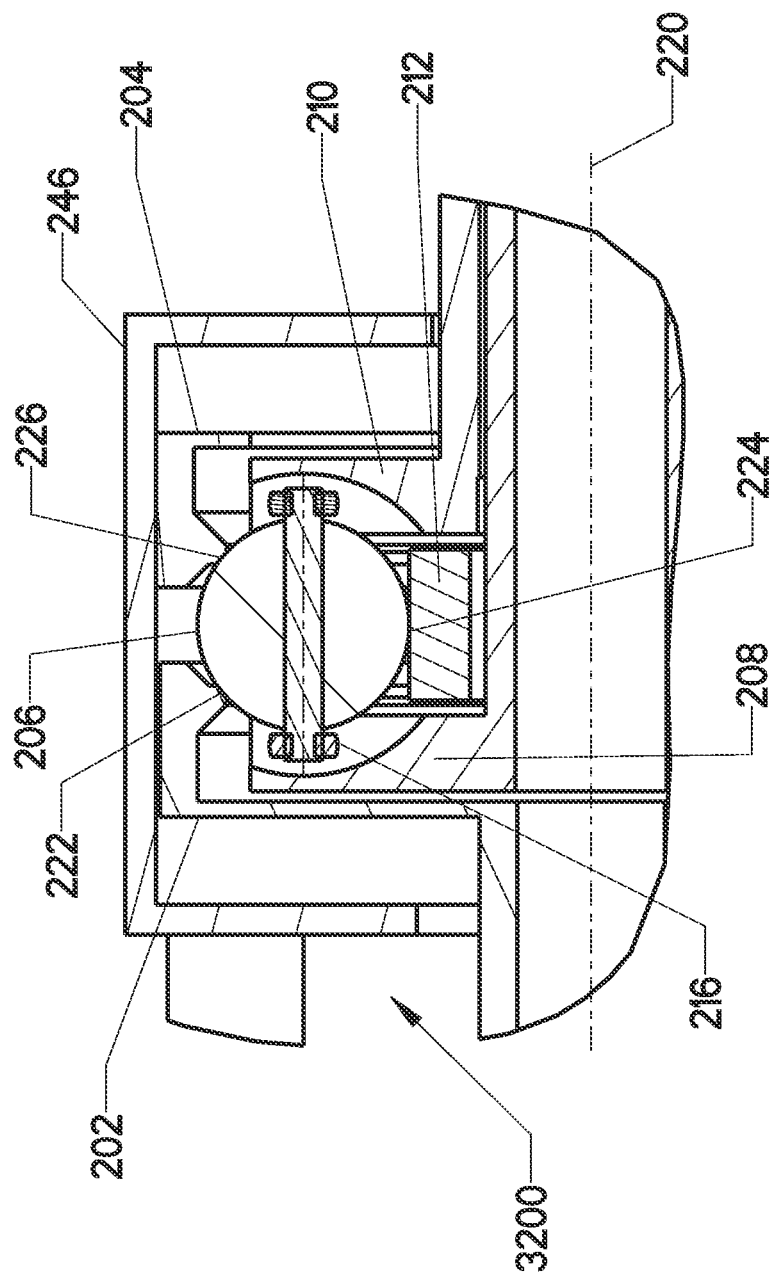
FIG. 7B is a cross-sectional side view of a portion of the input/output planetary ratio assembly of FIG. 7A.

FIG. 2A illustrates the input/output planetary ratio assembly 200 of the IVT 100. FIG. 7A illustrates the input/output planetary ratio assembly 3200 of the IVT 3100. In FIG. 2A, torque comes into the input/output planetary ratio assembly 200 from the input assembly 110 via the first traction ring 202. In FIG. 7A, torque comes into the input/output planetary ratio assembly 3200 from the input assembly 110 via the first traction ring 202. The input shaft assembly 110 and the first traction ring 202 are operatively connected. The first traction ring 202 contacts a planet 206 at contact point 222 as illustrated in the close up view provided in FIGS. 2B and 7B. At contact point 224, the planet 206 contacts a sun 212 and spins the sun 212 about the axis 220 of the input/output planetary ratio assembly 200 and in the input/output planetary ratio assembly 3200. The planet 206 contacts the second traction ring 204 at contact point 226. The input/output planetary ratio assembly 200 and in the input/output planetary ratio assembly 3200 has a relatively large clamping load that clamps the two traction rings 202 and 204 together. The reaction force from this clamping load goes through the traction rings 202 and 204 into the planets 206 and eventually to the sun 212. With multiple planets 206 this load gets equalized about the axis 220 of the input/output planetary ratio assembly 200 in embodiment 100 and with multiple planets 206 this load gets equalized about the axis 220 of the input/output planetary ratio assembly 3200 in embodiment 3100. The second traction ring 204 is operatively connected to the housing 238 as illustrated in the close up view provided in FIG. 2B and housing 246 in FIG. 7B. Both the second traction ring 204 and the housings 238 and 246 are fixed and do not rotate. Housing 238 could be bolted to a main housing through bolt holes 240 as shown in FIG. 5. Housing 246 could be bolted to a main housing through bosses 242 as shown in FIG. 6. Housings 238 and 246 could also be integrated into the main housing 244. As the first traction ring 202 rotates, the planets 206 spin about an axle 214. Since the second traction ring 204 is fixed and does not rotate, the planets both spin about their axles 214 and as a group they spin about the primary axis 220 of the input/output planetary ratio assembly 200 and of the input/output planetary ratio assembly 3200. Rollers 216 (or bearings or caps) are positioned on ends of axle 214. The rollers 216 fit in tracks 218 (best illustrated in FIG. 2C) in a first stator 208. The second stator 210 has similar tracks that the rollers 216 fit into. These tracks, in one embodiment, may or may not be offset from the tracks 218 in the first stator, 208. As the planets 206 rotate about the assembly axis 220 the axles 214 and the rollers 216 transmit this rotation through the tracks 218 and into both the first stator 208 and second stator 210 causing the two stators to both rotate about axis 220 of the input/output planetary ratio assembly 200 and of the input/output planetary ratio assembly 3200. Both of these stators are operatively connected to the output shaft assembly 120. Through the axle 214, rollers 216, and tracks 218, the stators rotate at essentially the same rate or RPM. However, the second stator 210 can rotate relative to first stator 208 within a certain range (typically fewer than 90°) while rotating at essentially the same rate or RPM. When the second stator 210 rotates relative to the first stator 208, the tracks 218 rotate relative to each other causing a phase change between the first 208 and second 210 stators. The planet axle 214 is restricted to follow the tracks 218 in the first stator 208 and in the tracks in the second stator 210. As the phase changes between the first stator 208 and the second stator 210, the axle will follow the tracks and will find a new equilibrium. Thus the angle of the axle 214 changes and the axle twists and tips relative to the X, Y, Z axis of the device changing the ratio of the IVT. How these two stators change phase between each other will be described in detail later. The torque path of the IVT 100 and IVT 3100 is from the input assembly 110 to the first traction ring 202, to the planet 206, through the axle 214 and rollers 216, through the tracks 218 of first stator 208 and similar tracks in the second stator 210 through the cam mechanism 400 (described below) and eventually out of the device through the output assembly 120. Additionally, a reaction torque is generated through the second traction ring 204 to ground through the housing 238 in embodiment 100 and through the housing 246 in embodiment 3100. Traction fluid 350 in the input/output planetary ratio assembly 200 and in the input/output planetary ratio assembly 3200 along with the clamping load between the traction rings 202 and 204, planets 206 and sun 212 allows torque and rotational motion to be transmitted from the input assembly 110 to the output assembly 120. In an IVT, a geared neutral condition exists. In this embodiment, this occurs when the axle 214 is parallel to the input/output planetary ratio assembly axis 220. To help ensure accurately locating neutral, a detent system could be designed between the shafts of the first stator 208 and second stator 210. This detent system would help ensure that the device is as close to neutral as manufacturing tolerances on the affected parts allowed. This detent system could be a spring and ball in one stator and a drilled hole, cut slot, cut groove in the other stator. Many ways of making a detent mechanism such as this are known and would work in this design. In another embodiment, a separately geared planetary system before or after the input/output planetary ratio 200 could change the overall IVT 1100 system geared neutral angle of axle 214 from that shown in this embodiment to a different angle with the same effect.

Figure 2D:
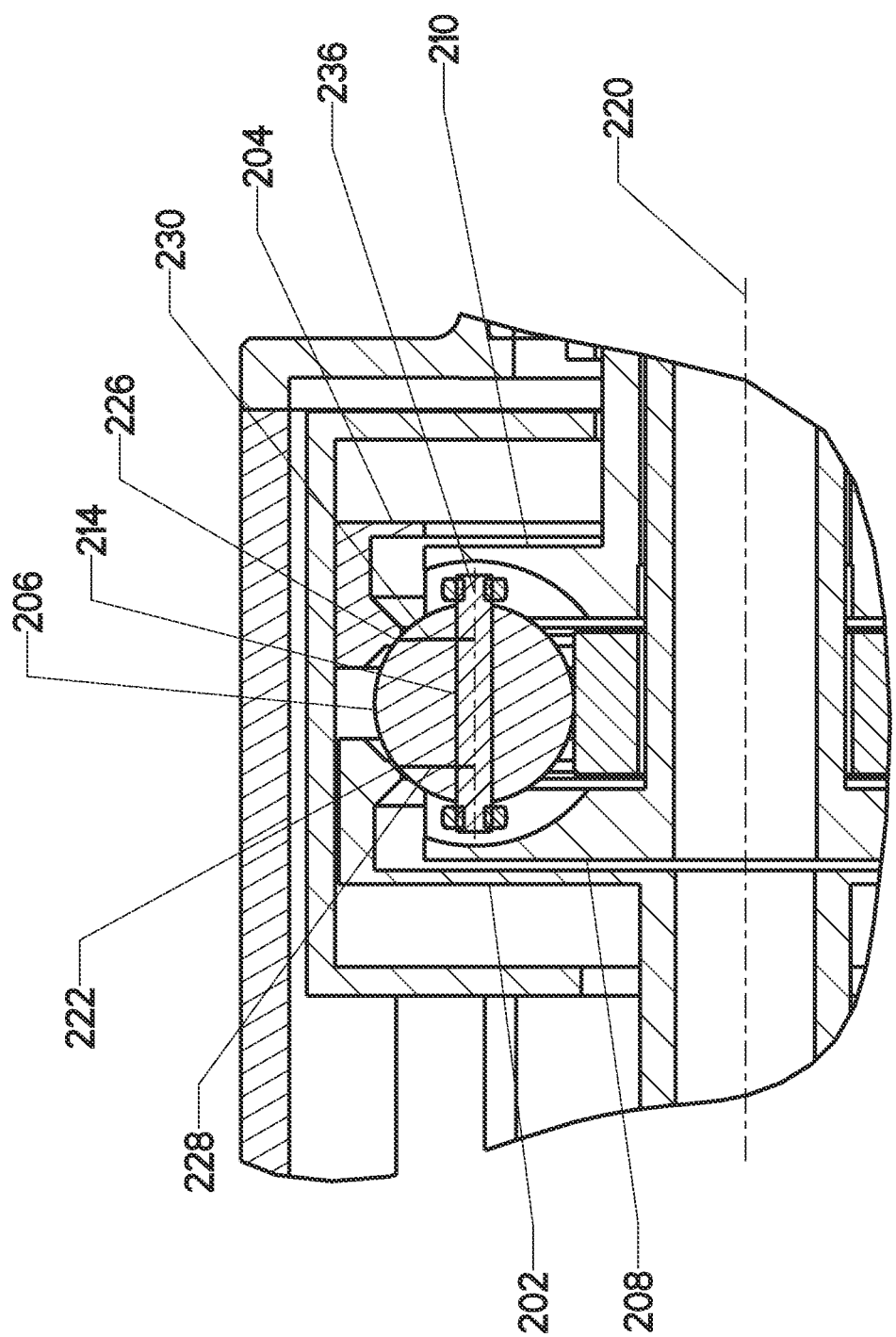
FIG. 2D is a cross-sectional side view of a portion of input/output planetary ratio assembly of FIG. 2A with an axle axis of the planet set to provide a first speed ratio.
Figure 2E:
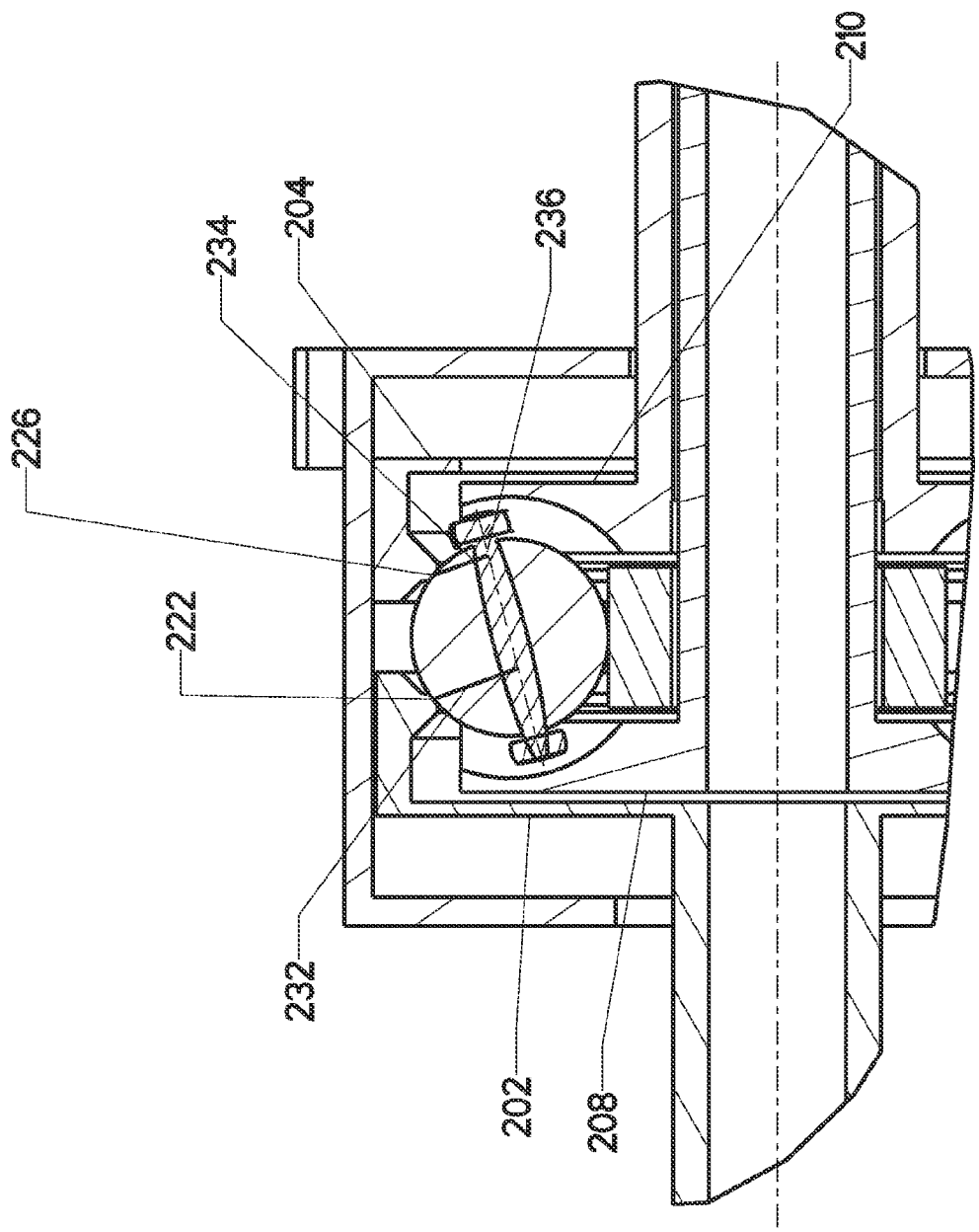
FIG. 2E is a cross-sectional side view of a portion of the input/output planetary ratio assembly of FIG. 2A with an axle axis of the planet set to provide a second speed ratio.
Figure 7D:
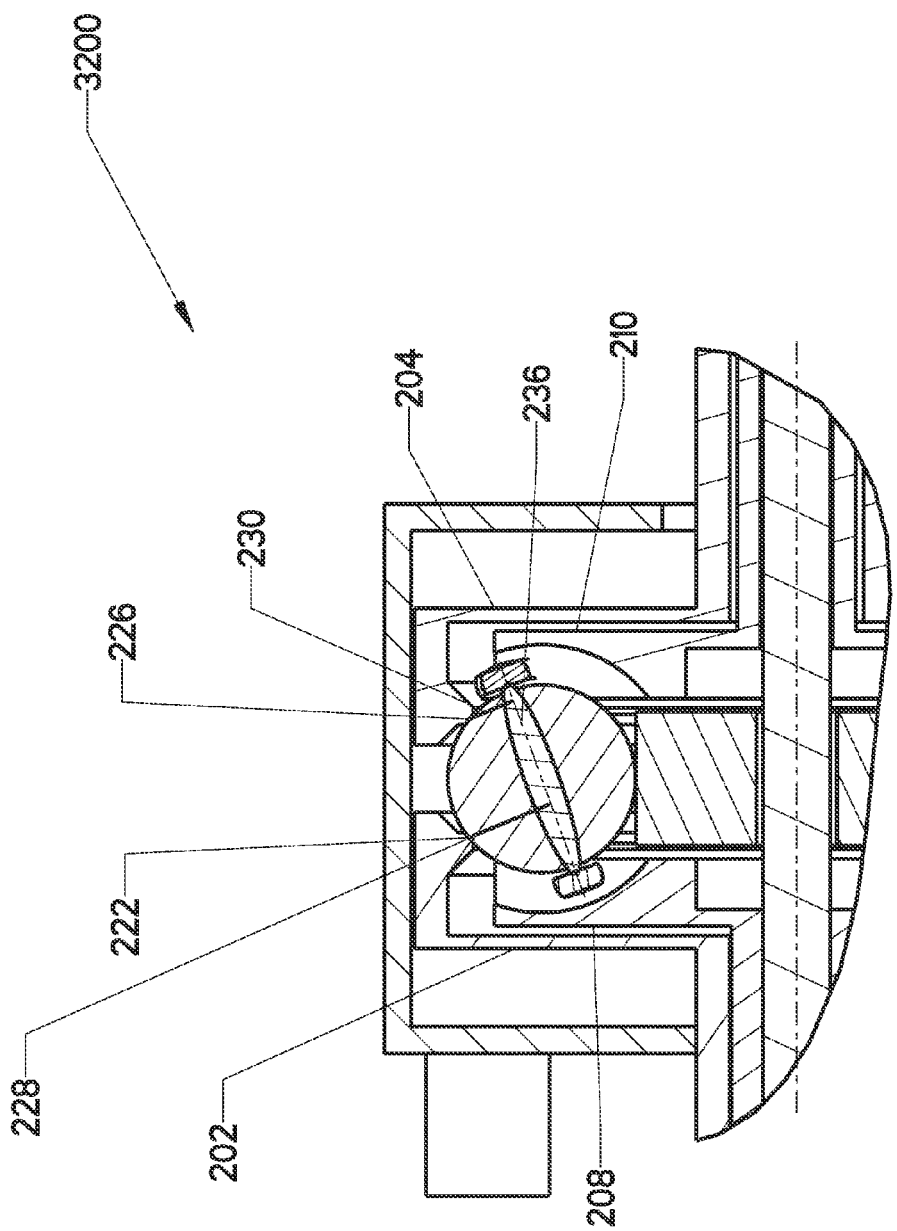
FIG. 7D is a cross-sectional side view of a portion of the input/output planetary ratio assembly of FIG. 7A with an axle axis of the planet set to provide a second speed ratio.

As discussed above, the IVT 100 and 3100 can change ratio from the input to the output. The ratio is calculated by the following formula (1−(input distance/output distance)). Referring to FIGS. 2D and 7C, the input distance is 228 which is the distance from the contact point, 222 to the axis 236 of the axle 214. The output distance is 230 which is the distance from contact point 226 to the axis 236 of the axle 214. As shown in FIGS. 2D and 7C, the device is in neutral when these distances are equal. Therefore, the first 208 and second 210 stators will not rotate when the first traction 202 ring is spinning. When the second stator 210 rotates relative to the first stator 208, the planet 206 and its axle twist and tip in the X, Y, and Z planes as partially shown in simplified FIGS. 2E and 7D. When this happens, the input distance 232 from contact point 222 to the axis 236 of the axle 214 gets longer and the output distance 234 from contact point 226 to the axis 236 of the axle 214 gets shorter causing a ratio change in input/output planetary ratio assembly 200 and in the input/output planetary ratio assembly 3200. Rotating the second stator 210 in the opposite direction will give you a reverse condition with the planet 206 and its accompanying parts rotating such that 232 gets shorter and 234 gets longer and the first 208 and second 210 stators will be rotating in the opposite direction compared to the first traction ring 202.

Figure 3A:
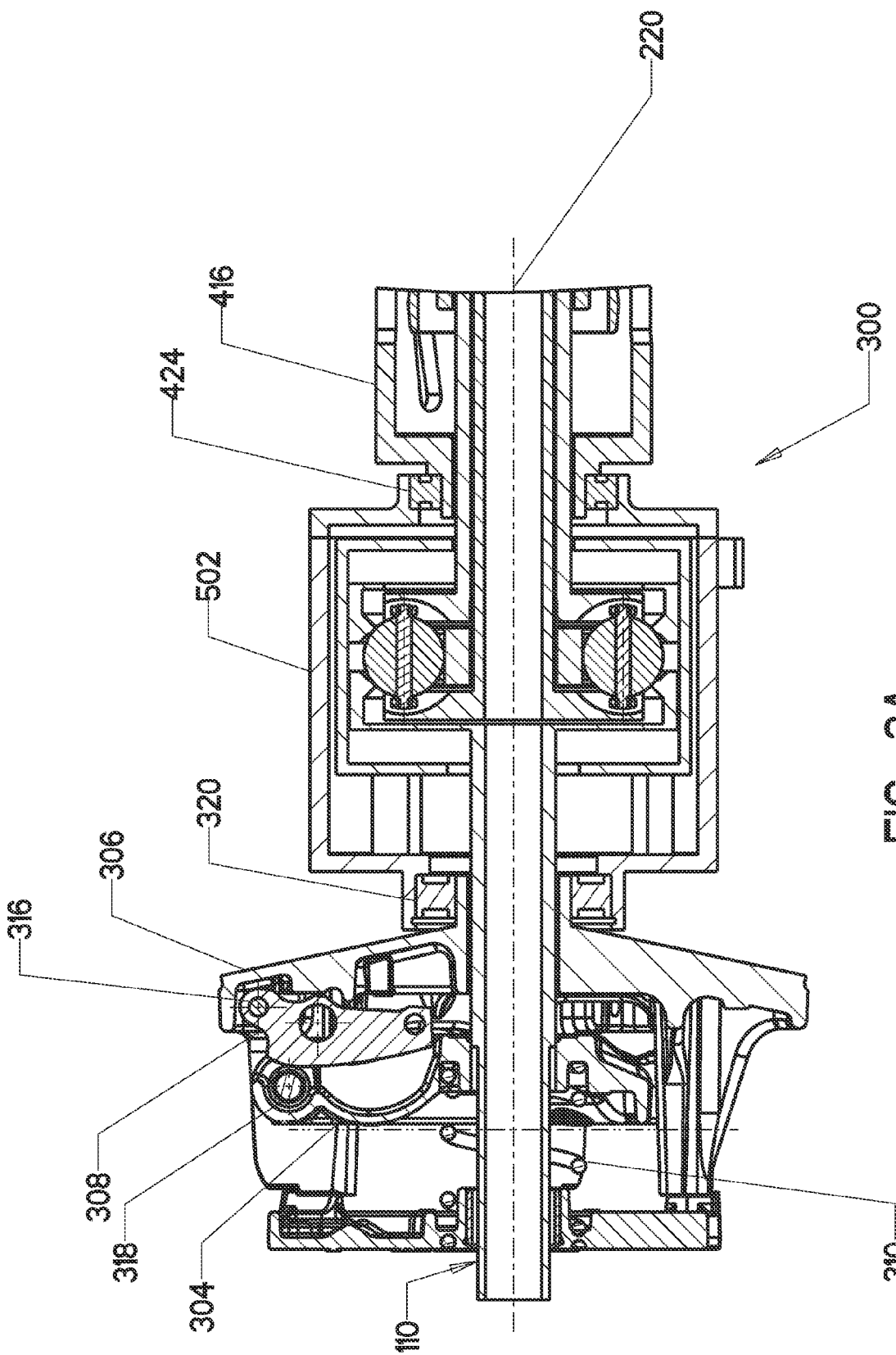
FIG. 3A is a cross-sectional side view of a input speed feedback control assembly of the IVT of FIG. 1.
Figure 3C:
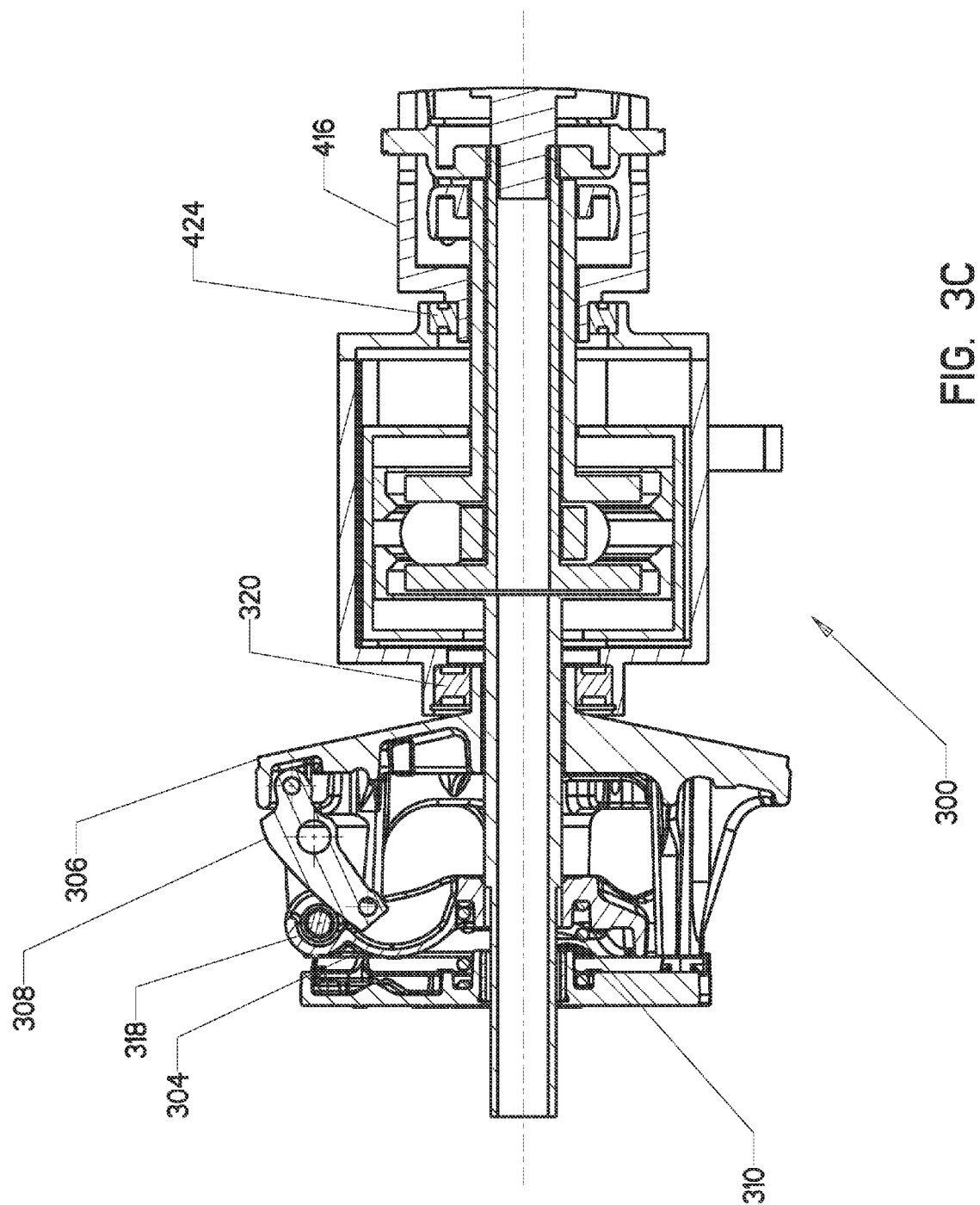
FIG. 3C is a cross-sectional side view of the input speed feedback control assembly of FIG. 3A positioned to provide a second/high speed shift position.

An input speed feedback control assembly is described below. Referring to the input speed feedback control assembly 300 illustrated in FIG. 3A, the input assembly 110 provides an input to the input speed feedback control assembly 300. Input assembly 110 may be a shaft, gear, pulley or the like. Moreover, input assembly 110 can be operatively connected directly to an engine crankshaft, or be operatively connected to the engine through a starter clutch, torque convertor, torque dampener, gear set and the like. Input assembly 110 delivers rotational motion to the input speed feedback control assembly 300. Spider 304 is operatively attached to input member 110. Spider 304 includes pucks 312 (illustrated in FIG. 3B) that contact a tower 314 on a member 306. Member 306 is rotationally connected to spider 304 but is slidably movable relative to spider 304. A shift weight 308 is pivotally attached to member 306 by pin 316. Pin 316 could be any fastener such as a pin or bolt. As the member 306 of the input speed feedback control assembly 300 spins with spider 304, the shift weight 308 spins about axis 220 of the input/output ratio assembly 200. The faster the member 306 spins, the more centrifugal force is asserted on the shift weight 308. The shift weight 308 is designed such that its center of gravity is above the pivot point of pin 316, so it imparts a force onto the roller 318, which is operatively connective to spider 304. The mechanics of the shift weight 308 to roller 318 creates an axial force along the X axis that will get transmitted through bearing 320 and 424 as well as collar 502 to torque feedback control assembly 400. The faster the input speed feedback control assembly 300 spins, the more axial force created by the shift weight 308. A plurality of shift weights, arranged about the axis 220, may also be utilized to the same effect. The input speed feedback control assembly 300 further includes a spring 310. The spring 310 is pre-loaded to a predetermined force. Its purpose is to bias the input speed feedback control assembly towards an input/output planetary ratio assembly 200 ratio extreme. In practice, this is typically a "low ratio" or neutral ratio, which, for this embodiment, is shown in FIG. 3A. Additionally, it is noted that a spring pre-loaded to a pre-determined force may be placed in other locations in the IVT to the same effect. As the input speed feedback control assembly 300 spins faster, the shift weight 308 creates more axial force. In embodiment 100, once this axial force gets higher than the spring 310 force, the member 306 starts to move towards the cam 416 of the torque feedback control assembly 400 and will shift the input/output ratio assembly 200 of the IVT into a different ratio. This shifting is further described below. FIG. 3C depicts the input speed feedback control assembly 300 in "high ratio." In embodiment 100, drive torque does not go through any part of the input speed feedback control assembly 300. In this embodiment, as shown in FIG. 5, collar 502 has straight slots 504 that fit with boss 248 of the input/output planet ratio assembly 200 and force the collar 502 to slide axially without rotation. Additional embodiments of this concept could include but not be limited to a mechanism where member 306 is operatively connected to shaft 110 and spider 304 was movable axially. Additionally, collar 502 could be anything to transmit the axial force between input speed feedback control assembly 300 and torque feedback control assembly 400 such as pins or rods. In another embodiment, drive torque could go through the input speed feedback control assembly 300.

Figure 8A:
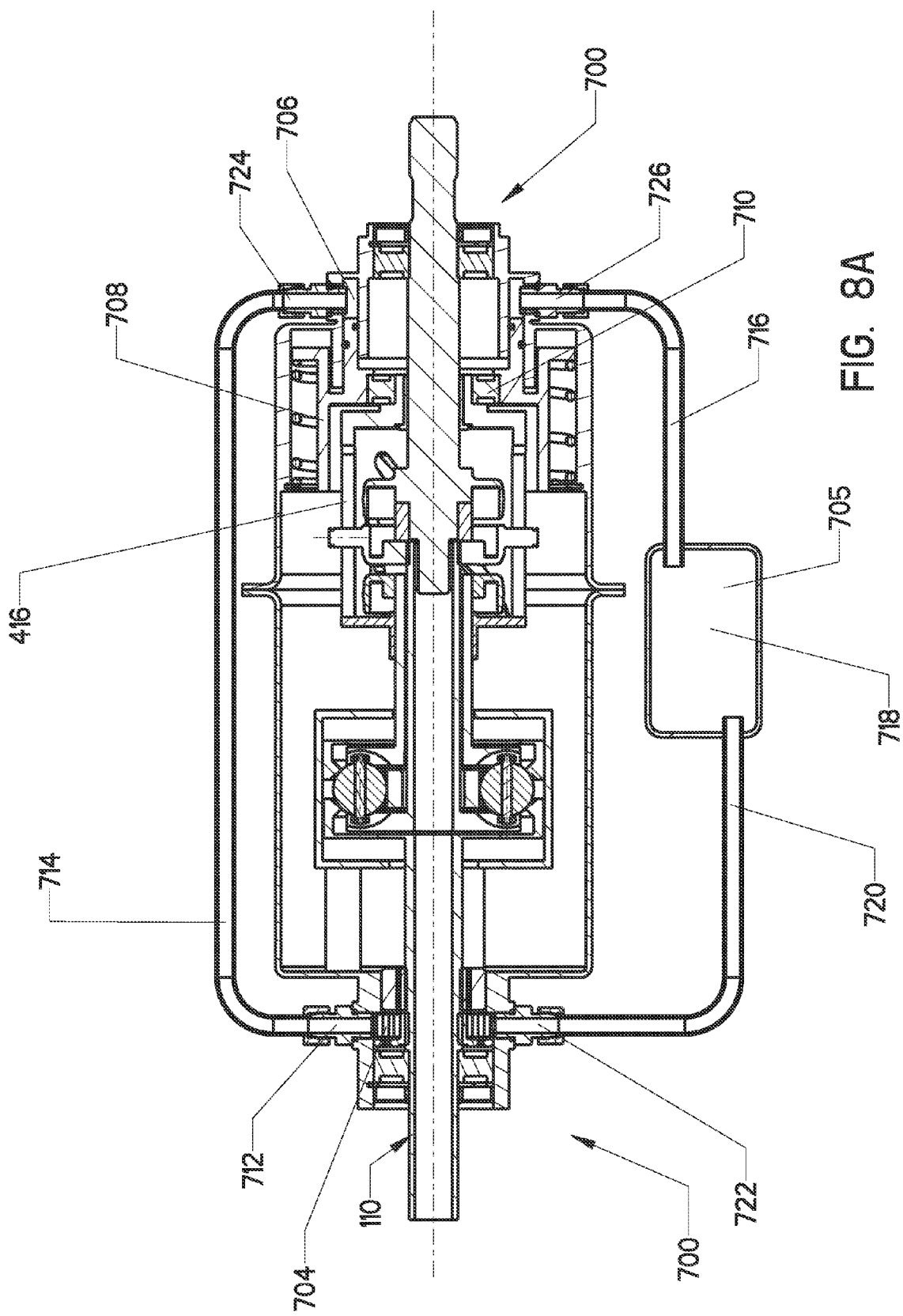
FIG. 8A is a cross-sectional side view of a input speed feedback control assembly of the IVT of FIG. 6.

Referring to the input speed feedback control assembly 700 illustrated in FIG. 8A, Input assembly 110 is an input shaft to assembly 700. Input assembly 110 can be operatively connected directly to an engine crankshaft, or be operatively connected to the engine through a starter clutch, torque converter, torque dampener, gear set or the like. Input assembly 110 delivers rotational motion to the input speed feedback control assembly 700. Input assembly 110 is operatively connected to a hydraulic pump 704 of the input speed feedback control assembly 700. The input speed feedback control assembly 700 includes a chamber 706 is in part defined by a piston 708, which may be annular or a set of one or more of cylindrical geometry. The shape is not essential to the operation but merely for packaging or manufacturing considerations. Additionally, the piston or pistons may be operatively connected to bearing 710 directly as shown or through a mechanism such as a pivot fork or other similar mechanical transformer. Hydraulic oil 705 is pumped through passages from the hydraulic pump outlet 712 to the chamber 706 through a passage 714 and inlet 724. Hydraulic oil 705 exits the chamber 706 through outlet 726 and through passage 716 and is returned to a sump 718, which supplies the hydraulic oil to the hydraulic pump 704 through a passage 720 and inlet 722. The flow of hydraulic oil may be impeded by fixed or variable means before or after the chamber 706, such as at the chamber 706 inlet 724 and chamber 706 outlet 726. As the input of the hydraulic pump 704 of the input speed feedback control assembly 700 rotates, hydraulic fluid flow is generated and supplied to the chamber 706. The faster the input of the hydraulic pump 704 rotates, the greater the hydraulic flow. As the hydraulic flow is impeded by fixed or variable means before or after the chamber 706, hydraulic pressure in the chamber 706 results, creating an axial force along the X axis against piston 708. This axial force is a function of input assembly member 110 rotational rate. As the pressure in chamber 706 increases, the piston 708 axial force increases in response. The input speed feedback control assembly 700 further includes a spring 728. The spring 728 is pre-loaded to a predetermined force. Its purpose is to bias the input speed feedback control assembly 700 in a ratio extreme. In practice, this is typically a "low ratio" or neutral ratio, which, for this embodiment, is shown in FIG. 8A. Additionally, a spring pre-loaded to a pre-determined force may be placed anywhere in the IVT with the purpose of biasing the input/output planetary ratio assembly 3200 towards a ratio extreme. As the input speed feedback control assembly 700 member 110 spins faster, the hydraulic pressure of chamber 706 exerts more axial force on the piston 708. Once this axial force gets higher than the spring force, the piston 708 starts to move towards the cam 416 of the torque feedback control assembly 400 and will shift the input/output ratio assembly 3200 of the IVT into a different ratio. FIG. 8B depicts the input speed feedback control assembly 700 in "high ratio". The axial force created by the input speed feedback control assembly 700 gets transmitted to the torque feedback control assembly 400 through bearing 710. In addition, they hydraulic oil 705 can be a wide variety of oils that are in common use specifically for current commercial hydraulic systems including those formulated primarily for lubrication, traction, and cooling.

In an additional embodiment, shift-weights that travel radially between the spider and the movable member produce a centrifugal radial force as a function of input rotational speed that is transformed into an axial force as a result of the angles of contact between the shift-weights and the spider and movable member. In yet another embodiment a generator output such as a magneto electrically operatively connected to an electromagnetic actuator such as a DC motor or solenoid exerts an axial force in opposing direction to the torque feedback control assembly. In yet another embodiment an electronic proximity sensor such as a hall-effect, reed, variable reluctance can be interfaced with a microprocessor to detect and calculate input shaft rotational rate and deliver an electrical power signal to an electrically controlled actuator. This electrical power signal may be a linear or non-linear function of input shaft rotational rate. The algorithm may also be a function of atmospheric barometric pressure in order to compensate for engine power output changes that occur as a result of altitude changes. An electrically controlled actuator may apply an axial force directly or indirectly to the torque feedback control assembly or may control a valve in a hydraulic circuit that regulates the hydraulic pressure and thus control the axial force. An electrically controlled actuator may apply piston hydraulic pressure that is in communication with a piston that may exert an axial force in opposing direction to the torque feedback control assembly.

Figure 4:
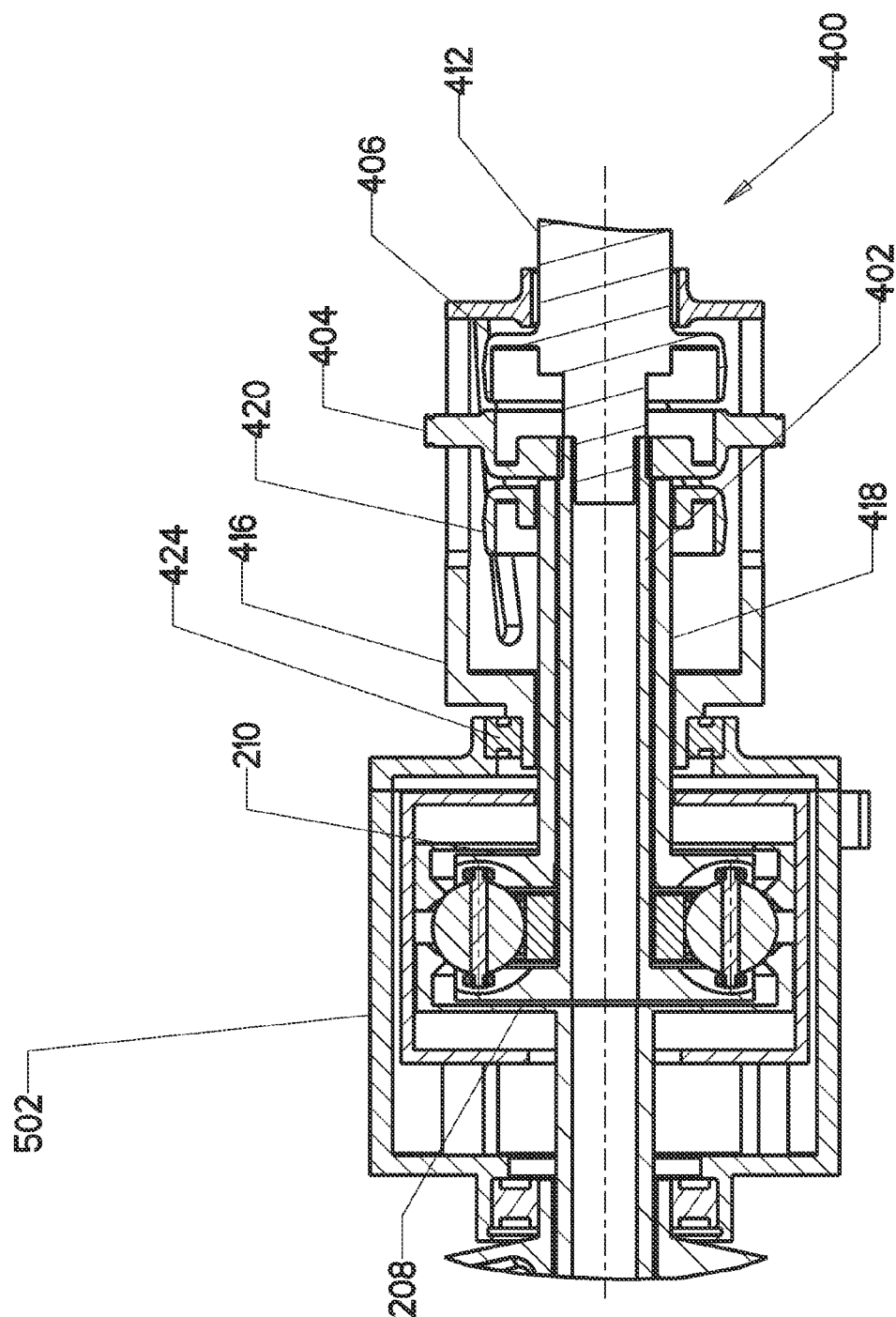
FIG. 4 is a cross-sectional side view of the torque feedback control assembly of the IVT of FIG. 1.
Figure 9:
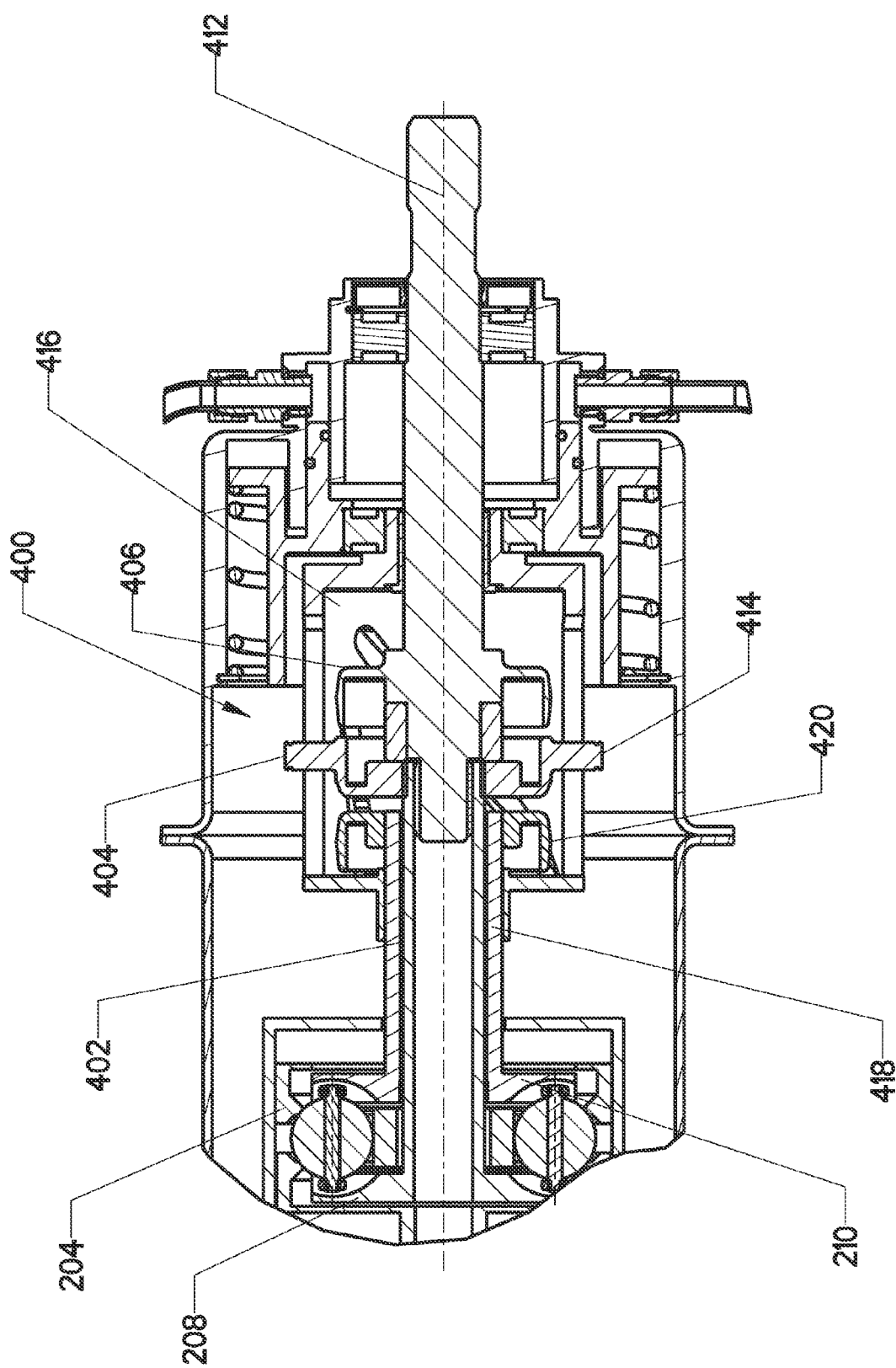
FIG. 9 is a cross-sectional side view of the torque feedback control assembly of the IVT of FIG. 6.
Figure 10:
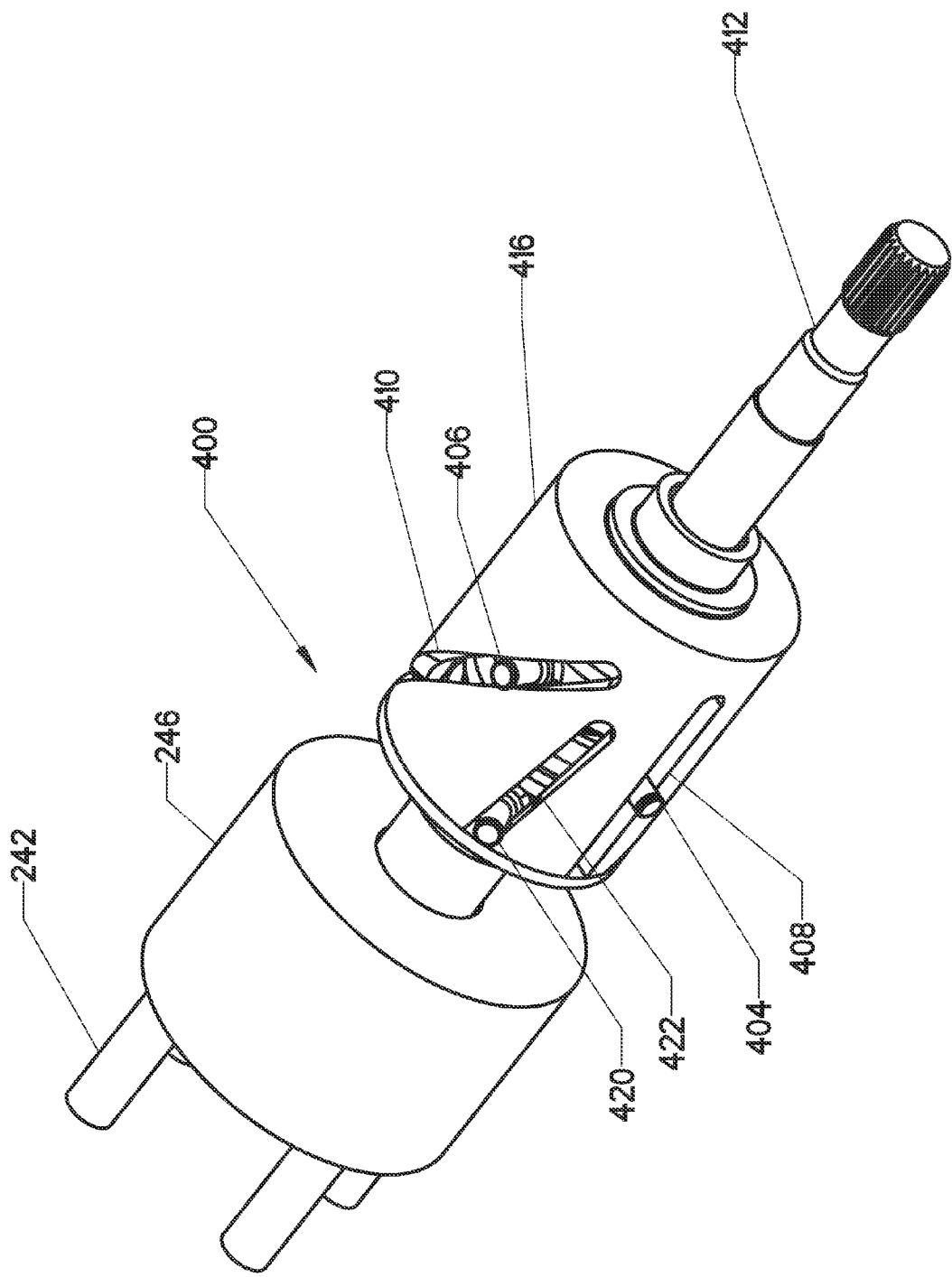
FIG. 10 is a perspective view of the torque feedback control assembly of the IVT of FIG. 6.

Shaft 402 is a first output shaft from the input/output planetary ratio assembly 200 and in the input/output planetary ratio assembly 3200. Shaft 402 is operatively connected to a first stator 208 as best illustrated in FIGS. 4 and 9. Shaft 418 is a second output shaft from the input/output planetary ratio assembly 200 and in the input/output planetary ratio assembly 3200. Shaft 418 is operatively connected to a second stator 210 as best illustrated in FIGS. 4 and 9. Shaft 402 and shaft 418 transmit torque and rotational motion. As illustrated in FIGS. 4 and 9, shaft 402 and shaft 418 go into the torque feedback control assembly 400. The purpose of the torque feedback control assembly 400 is to transmit torque and using this torque, create a proportional axial, X force to oppose the input speed feedback control assembly 300 and 700. This axial, X force is transferred to input speed feedback control assembly 300 through bearings 320 and 424 as well as collar 502 in embodiment 100 or input speed feedback control assembly 700 through bearing 710 in embodiment 3100. The axial location of a torque feedback cam 416 of the torque feedback control assembly 400 dictates the phase relationship between two cam spiders 404 and 420 which controls the shifting mechanism inside the input/output planetary ratio assembly 200 and in the input/output planetary ratio assembly 3200. The torque comes into the torque feedback control assembly 400 with both shaft 402 and 418 carrying torque. Shaft 402 is operatively connected to the first spider 404. This first spider 404 transmits torque to a straight (or generally straight) track 408 (first set of tracks) as best illustrated in FIGS. 5 and 10. Shaft 418 is operatively connected to the second spider 420. This second spider 420 transmits torque to a helical or curved track 422 (second set of tracks) as best illustrated in FIGS. 5 and 10. The first spider 404, the second spider 420 and the respective set of tracks 408 and 422 in the torque feed cam 416 make up a phase relation system of a cam and spider system of the torque feedback control assembly 400. The torque and rotational motion are then in the torque feedback cam 416 of the torque feedback control assembly 400. This torque and rotational motion then go to helix track 410 (third set of tracks) and to a third spider 406. The third spider 406 and the third set of tracks 410 make up a torque system in the cam and spider system of the torque feedback control assembly 400. Because track 408 is straight in the cam 416, there is little to no axial force. Because of the helical nature of track 422 in the cam 416, an axial force is created in the contact area with the second spider 420. Because of the helical nature of track 410 in the cam 416, an axial force is created in the contact area with the third spider 406. The combination of these axial forces opposes the force created by the input speed feedback control assembly 300 or input speed feedback control assembly 700. Therefore the lower the torque load from the vehicle, the lower the axial force created by the torque feedback control assembly 400 and the higher the torque load from the vehicle, the higher the axial force created by the torque feedback control assembly 400. The torque and rotational motion then goes from the third spider 406 into the IVT output shaft 412. Output shaft 412 is operatively connected to the load, such as the tires of a vehicle. Forces between the input speed feedback control assembly 300 or input speed feedback control assembly 700 and torque feedback control assembly 400 balance at a unique axial location for any given combination of input speed and output torque. If there is relatively high engine speed, the input speed feedback control assembly 300 or input speed feedback control assembly 700 input spins at a relatively high rotational motion creating relatively high axial force. If there is low vehicle torque, the torque feedback control assembly 400 has relatively low axial force and the mechanism wants to shift into a higher ratio meaning the vehicle will go relatively faster. Additionally, rollers could be put on the spider pins 414 to reduce friction.

The preferred embodiment has been shown and described above. An additional embodiment interchanges the straight 408 and helical 410 and/or 422 tracks. Additionally the first two tracks 408 and 422 may both be helical with different angles where the difference in the angles will provide the phase change between the two spiders 404 and 420. Additionally track 408 could have a negative angle as compared to a positive angle for track 422 this would cancel out or minimize the axial force created through spiders 404 and 420 and sets of tracks 408 and 422. Additionally track 408 could be a negative angle as compared to a positive angle for track 422 wherein the axial force created through these two spiders 404 and 420 and sets of tracks 408 and 422 results in an axial force relative to vehicle torque. The difference between the track angles for tracks 408 and 422 would create the phase change required between spiders 404 and 420 to shift the IVT. Moreover, additional embodiments include using splines, screw threads, face cams, ball-ramp cams or tracks cut into the operative shafts along with cam followers, mating splines, mating threads to realize the function of the spiders and straight and helical tracks previously described.

Figure 11:
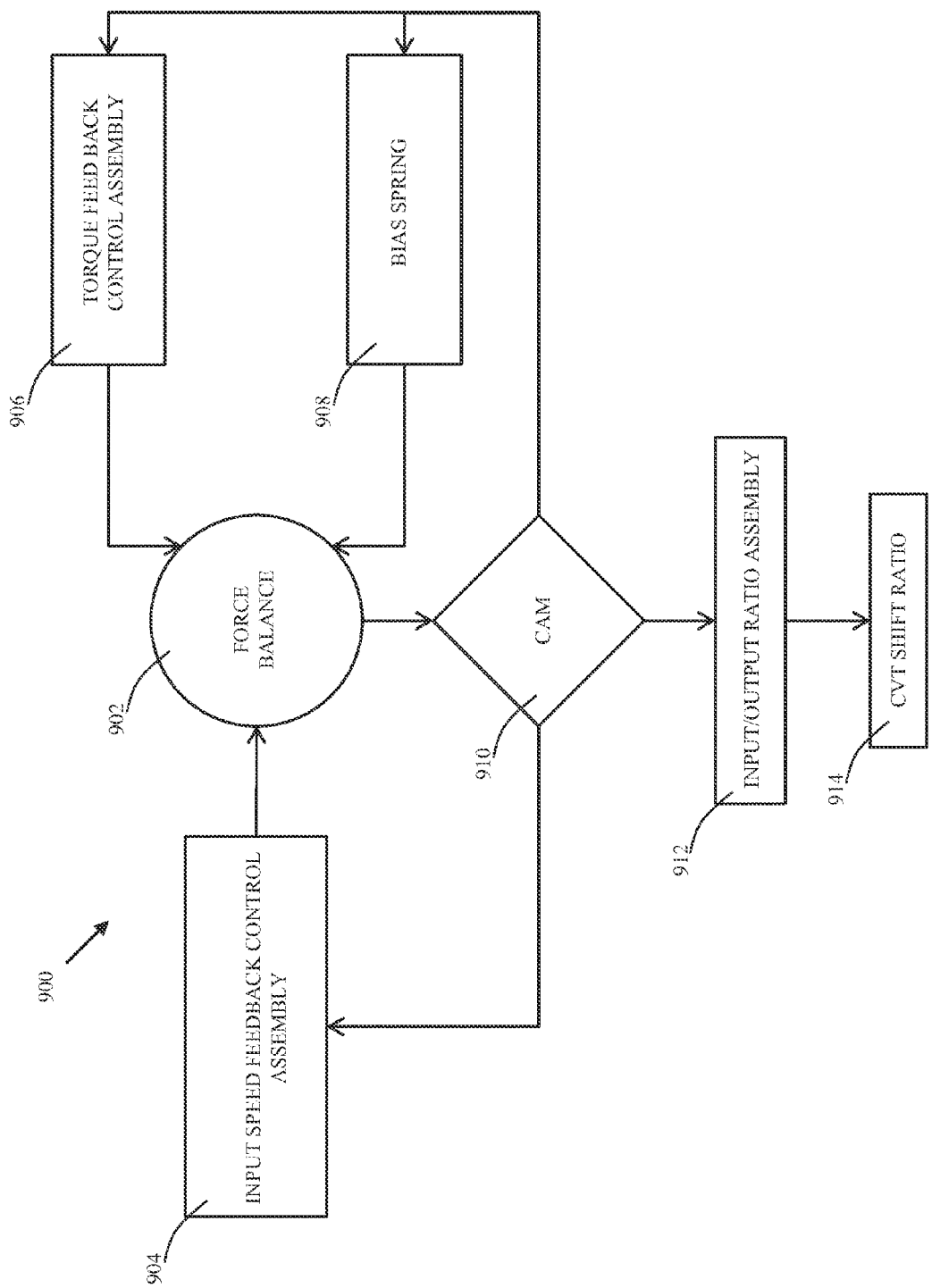
FIG. 11 is a function block diagram schematic of an IVT of an embodiment of the present invention.

FIG. 11 is a functional block diagram 900 of the present invention. Input speed feedback control assembly 904 produces a translational force as a linear or non-linear function of input shaft 110 rotational rate and as a constant, linear or non-linear function of translational position. Torque feedback control assembly 906 produces a translational force as a linear or non-linear function of output shaft 120 torque and as a constant, linear or non-linear function of translational position. Bias spring 908 produces a force as a constant, linear, or non-linear function of translational position. Translational force balance 902 outputs a translational position of cam 910 in accordance with the following equation:

Input Speed Feedback Control Assembly Force[Input Assembly 110 Rotational Speed, Translational Position]−Torque Feedback Control Assembly Force[Output Assembly 120 Torque, Translational Position]−Bias Spring Force[Translational Position]=0.

The input speed feedback control assembly 904, the torque feedback control assembly 906, the bias spring 908 and the cam 910 are translationally operatively connected. The translational position of cam 910 dictates the phase relationship of the first and second stators of an input/output planetary ratio assembly 912 that in turn dictates a specific shift ratio of a CVT 914.

In summary, as the force balance of the input speed feedback control assembly 300 or input speed feedback control assembly 700 and torque feedback control assembly 400 balance at a particular axial location, the second stator 210 will correspond and rotate relative to the first stator 208 changing the ratio of the input/output planetary ratio assembly 200 and in the input/output planetary ratio assembly 3200. The first 208 and second 210 stator functions are interchanged in another embodiment. With the change in phase between these two stators, the IVT 100 and 3100 change ratio. In embodiments, shifting of the IVT 100 and 3100 is accomplished with a input speed feedback control assembly 300 or input speed feedback control assembly 700 that uses rotational motion from an engine or other input to create an axial force that force balances with a torque feedback control assembly 400 that is operatively connected to the torque load, such as the tires of a vehicle. This shifting design, has applications to other transmission devices such as a Continuously Variable Transmission (CVT) of similar designs as well as a IVT system where the input and output are both coaxial to the IVT 100 and 3100 and on the same side of the IVT 100 and 3100.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. An infinitely variable transmission comprising:
   an input assembly configured to be coupled to receive input rotational motion;
   an output assembly to provide a rotational output, the output assembly configured to be rotationally coupled to a load;
   an input/output planetary ratio assembly configured and arranged to set an input to output speed ratio, the input/output planetary ratio assembly including a first and second stator;
   a torque feedback control assembly configured and arranged to provide torque feedback to the input/output planetary ratio assembly to at least in part control the input to output speed ratio of the input/output planetary ratio assembly, the torque feedback control assembly including a phase relation system operationally coupled to the first and second stator and a cam torque system coupled to the output assembly, the phase relation system further being in operational communication with the cam torque system; and
   the phase relation system and cam torque system of the torque feedback control assembly further having a cam and spider system that includes at least three sets of spider tracks and three cam spiders, each cam spider received within a respective set of spider tracks, at least one set of spider tracks not being parallel with at least one other set of spider tracks, one cam spider operationally coupled to the first stator, another cam spider operationally coupled to the second stator and yet another cam spider operationally coupled to the output assembly.

2. The infinitely variable transmission of claim 1, further comprising:
the input/output planetary ratio assembly including,
a first shaft coupled to the first stator,
a second shaft coupled to the second stator, the first shaft received within the second shaft, and
a plurality of planets movably engaged between the first and second stator, the input/output ratio based on a rotation of the second stator and the first stator in relation to each other; and
the torque feedback control assembly including,
the first cam spider operatively coupled to the first shaft, the first spider having portions received in a first set of the spider tracks of the torque feedback cam,
the second cam spider operatively coupled to the second shaft, the second spider having portions received in a second set of the spider tracks of the feedback cam, and
the third cam spider having portions received in a third set of spider tracks of the feedback cam, the third spider operationally coupled to the output assembly.

3. The infinitely variable transmission of claim 2, further comprising:
the first set of tracks being generally straight; and
the second set of tracks being generally helical.

4. The infinitely variable transmission of claim 2, wherein the input/output planetary ratio assembly further comprises:
the first stator having a first disk portion with a plurality of first tracks, the first shaft extending centrally from the first disk portion;
the second stator having a second disk portion with a plurality of second tracks, the second shaft extending centrally from the second disk portion;
the plurality of planets movably engaged between the first disk portion of the first stator and the second disk portion of the second stator;
an axle extending through an axis of each planet; and
rollers coupled to first and second ends of each axle, the first end of each axle received in one of the first tracks of the first stator and the second end of each axle received in one of the second tracks of the second stator.

5. The infinitely variable transmission of claim 1, further comprising:
an input speed feedback control assembly configured and arranged to provide an axial force in response to a rotation from the input assembly.

6. The infinitely variable transmission of claim 5, wherein the input speed feedback control assembly further comprises:
an input shaft operationally coupled to the input assembly;
an input speed feedback control assembly spider operationally coupled to the input shaft;
a moveable member slideably positioned along an axis of the input assembly; and
a shift weight configured and arranged to assert a force on the input speed feedback control assembly spider such that as the input speed feedback control assembly spins an axial force is generated to axially move the moveable member to apply a force on the torque feedback control assembly.

7. The infinitely variable transmission of claim 6, wherein the movable member of the input feedback control assembly asserts the axial force on a housing of the input/output planetary ratio assembly which in turn applies a force on the torque feedback control assembly.

8. The infinitely variable transmission of claim 5, wherein the input speed feedback control assembly further comprises:
a hydraulic pump in rotational communication with the input assembly; and
a piston in fluid communication with the hydraulic pump, the piston further in mechanical communication with the torque feedback control assembly such that a hydraulic pressure over a predetermined hydraulic pressure from the hydraulic pump moves the piston therein effecting the torque feedback control assembly.

9. The infinitely variable transmission of claim 8, wherein the input speed feedback control assembly further comprises:
a biasing member asserting a biasing force on the piston to bias the input/output planetary ratio assembly in a low or neutral ratio when the hydraulic pressure by the hydraulic pump has not reached the predetermined hydraulic pressure.

10. An infinitely variable transmission comprising:
an input assembly configured to be coupled to receive input rotational motion;
an output assembly to provide a rotational output, the output assembly configured to be rotationally coupled to a load;
an input/output planetary ratio assembly configured and arranged to set an input to output speed ratio, the input/output planetary ratio assembly including a first and second stator;
an input speed feedback control assembly configured and arranged to provide an axial force in response to a rotation from the input assembly;
a torque feedback control assembly configured and arranged to provide torque feedback to the input/output planetary ratio assembly to at least in part control the input to output speed ratio of the input/output planetary ratio assembly, the torque feedback control assembly including a phase relation system operationally coupled to the first and second stator and a cam torque system coupled to the output assembly, the phase relation system further being in operational communication with the cam torque system; and
wherein the phase relation system and cam torque system of the torque feedback control assembly further includes,
a cam and spider system that includes a torque feedback cam having at least three sets of spider tracks, with at least one set of the spider tracks not being parallel with at least one other set of spider tracks, the cam and spider system further having a first cam spider that is operationally connected to the first stator and is received in a first set of spider tracks, the torque feedback control assembly further yet having a second cam spider that is operationally connected to the second stator and is received in a second set of spider tracks and a third cam spider that is operationally coupled to the output assembly and is received in a third set of spider tracks.

11. The infinitely variable transmission of claim 10, further comprising:
the first set of spider tracks being generally straight; and
the second set of spider tracks being generally helical.

12. The infinitely variable transmission of claim 10, further comprising:
the input/output planetary ratio assembly including,
a first shaft coupled to the first stator, a second shaft coupled to the second stator, the first shaft received within the second shaft, and a plurality of planets movably engaged between the first and second stator, the input/output planetary ratio based on a rotation of the second stator and the first stator in relation to each other; and the torque feedback control assembly further including, the first cam spider operatively coupled to the first shaft, and the second cam spider operatively coupled to the second shaft.

13. The infinitely variable transmission of claim 12, wherein the input/output planetary ratio assembly further comprises:

the first stator having a first disk portion with a plurality of first tracks, the first shaft centrally extending from the first disk portion;

the second stator having a second disk portion with a plurality of second tracks, the second shaft extending centrally from the second disk portion;

an axle extending through an axis of each planet; and rollers coupled to first and second ends of each axle, the first end of each axle received in one of the first tracks of the first stator and the second end of each axle received in one of the second tracks of the second stator.

14. The infinitely variable transmission of claim 10, wherein the input speed feedback control assembly further comprises:

an input shaft operationally coupled to the input assembly;

an input speed feedback control assembly spider operationally coupled to the input shaft;

a moveable member slideably positioned along an axis of the input assembly; and a shift weight configured and arranged to assert a force on the input speed feedback control assembly spider such that as the input speed feedback control assembly spins an axial force is generated to axially move the moveable member to apply a force on the torque feedback control assembly.

15. An infinitely variable transmission comprising:

an input assembly configured to be coupled to receive input rotational motion;

an output assembly to provide a rotational output, the output assembly configured to be rotationally coupled to a load;

an input/output planetary ratio assembly configured and arranged to set an input to output speed ratio, the input/output planetary ratio assembly having a first stator coupled to a first shaft and a second stator coupled to a second shaft;

an input speed feedback control assembly configured and arranged to provide an axial force in response to a rotation from the input assembly; and a torque feedback control assembly configured and arranged to provide torque feedback to the input/output planetary ratio assembly to at least in part control the input to output speed ratio of the input/output planetary ratio assembly, the torque feedback control assembly including, a torque feedback cam configured and arranged to receive the axial force from the input speed feedback control assembly, the torque feedback cam having at least three sets of spider tracks, with at least one of the sets of spider tracks being not parallel with at least one other set of spider tracks, a first cam spider operatively coupled to the first shaft, the first spider having portions received in a first set of spider tracks of the torque feedback cam, a second cam spider operatively coupled to the second shaft, the second spider having portions received in a second set of the spider tracks of the torque feedback cam, and a third cam spider having portions received in a third set of tracks, the third spider coupled to the output assembly.

16. The infinitely variable transmission of claim 15, wherein the input speed feedback control assembly further comprises:

an input shaft operationally coupled to the input assembly;

an input speed feedback control assembly spider operationally coupled to the input shaft;

a moveable member slideably positioned along an axis of the input assembly; and a shift weight configured and arranged to assert a force on the input speed feedback control assembly spider such that as the input speed feedback control assembly spins an axial force is generated to axially move the moveable member to apply a force on the torque feedback control assembly.

17. The infinitely variable transmission of claim 15, wherein the input speed feedback control assembly further comprises:

a hydraulic pump in rotational communication with the input assembly; and a piston in fluid communication with the hydraulic pump, the piston further in mechanical communication with the torque feedback control assembly such that a hydraulic pressure over a predetermined hydraulic pressure from the hydraulic pump moves the piston therein effecting the torque feedback control assembly.

18. The infinitely variable transmission of claim 15, wherein the input/output planetary ratio assembly further comprises:

the first stator having a first disk portion with a plurality of first tracks, the first shaft centrally extending from the first disk portion;

the second stator having a second disk portion with a plurality of second tracks, the second shaft extending centrally from the second disk portion;

a plurality of planets movably engaged between the first disk portion of the first stator and the second disk portion of the second stator;

an axle extending through an axis of each planet; and rollers coupled to first and second ends of each axle, the first end of each axle received in one of the first tracks of the first stator and the second end of each axle received in one of the second tracks of the second stator.

* * * * *